United States Patent [19]
Lee et al.

[11] Patent Number: 6,023,470
[45] Date of Patent: Feb. 8, 2000

[54] POINT OF PRESENCE (POP) FOR DIGITAL FACSIMILE NETWORK WITH VIRTUAL POPS USED TO COMMUNICATE WITH OTHER NETWORKS

[76] Inventors: Warren S. Lee, 3858 Brampton Island Ct. No, Jacksonville, Fla. 32224; David W. Copp, 2101 Wood Hill Pl., Jacksonville, Fla. 32256; Dale T. Platteter, 21 Powder Mill Dr., Pittsford, N.Y. 14534; Neil P. Carrier, 10200 Belle Rive Blvd., #260, Jacksonville, Fla. 32256

[21] Appl. No.: 08/649,572

[22] Filed: May 17, 1996

[51] Int. Cl.$^7$ .......................... H04L 12/28; H04Q 11/00
[52] U.S. Cl. ............................... 370/401; 370/474
[58] Field of Search ..................... 370/463, 465, 370/474, 475, 476, 395, 401, 402; 379/100.1

[56] References Cited

U.S. PATENT DOCUMENTS

| | | | |
|---|---|---|---|
| 4,058,838 | 11/1977 | Crager et al. | 358/257 |
| 4,741,021 | 4/1988 | Kotani et al. | 379/100 |
| 4,746,986 | 5/1988 | Tanigawa | 358/256 |

(List continued on next page.)

OTHER PUBLICATIONS

CCITT X.5: Data Communication Networks: Services and Facilities, Interfaces—Facsimile Packet Assembly/Disassembly Facilituy (FPAD) in a Public Data Network, Geneva, 1992.

CCITT X.39: Data Communication Networks: Services and Facilities, Interface—Procedures for the Exchange of Control Information and User Data Between a Facsimile Packet Assembly/Disassembly (FPAD) Facility and a packet Mode Data Terminal Equipment (DTE) or Another FPAD, Geneva 1992.

ITU–I X.29: Public Data Networks: Interfaces—Procedures for the Exchange of Control Information and User Data Between a Packet Assembly/Disassembly (PAD) Facility and a Packet Mode DTE or Another Pad, Mar. 1993.

*Primary Examiner*—Ajit Patel

[57] ABSTRACT

A fax network for communicating fax transmissions over either a conventional public switched telephone network or a digital (frame relay) network based on a telephone number of a destination fax machine. If the destination fax machine can be serviced by the digital network, a faxjack intercepts the phone digits on the telephone link, and redirects the call to a local point-of-presence, which is preferably located near the local exchange carrier. The POP receives information related to the desired fax transmission from the faxjack, and accesses a destination POP via the digital network. The destination POP is local with respect to the destination fax machine, and the destination POP attempts to contact the destination fax machine to ascertain if a fax session is allowable. If so, the destination POP notifies the source POP, which then notifies the faxjack, thereby allowing the fax session to start. The source POP packetizes the analog fax data received from the sending fax machine, and sends the fax data as packets over the digital network to the destination POP. The destination POP unpacketizes the data, and sends the fax data using a standard protocol and a standard local telephone link to the destination fax machine. Each of the POPs can be configured as a virtual POP to communicate with another data network using the virtual POP as a gateway.

4 Claims, 11 Drawing Sheets

U.S. PATENT DOCUMENTS

| | | | |
|---|---|---|---|
| 4,947,390 | 8/1990 | Sheehy | 370/401 |
| 4,961,185 | 10/1990 | Sawada | 370/79 |
| 4,964,154 | 10/1990 | Shimotono | 379/100 |
| 4,964,159 | 10/1990 | Son | 379/356 |
| 4,974,097 | 11/1990 | Kaneko et al. | 358/400 |
| 4,999,836 | 3/1991 | Fujiwara | 370/110.1 |
| 5,033,078 | 7/1991 | Andoh | 379/100 |
| 5,034,948 | 7/1991 | Mizutani et al. | 370/79 |
| 5,050,005 | 9/1991 | Kagami | 358/434 |
| 5,051,983 | 9/1991 | Kammerl | 370/474 |
| 5,065,427 | 11/1991 | Godbole | 379/100 |
| 5,113,392 | 5/1992 | Takiyasu et al. | 370/474 |
| 5,113,396 | 5/1992 | Kagami | 370/110.2 |
| 5,134,611 | 7/1992 | Steinka et al. | 370/79 |
| 5,134,653 | 7/1992 | Satomi et al. | 379/355 |
| 5,142,568 | 8/1992 | Ogata et al. | 379/100 |
| 5,170,428 | 12/1992 | Watanabe et al. | 379/94 |
| 5,187,591 | 2/1993 | Guy et al. | 358/425 |
| 5,189,525 | 2/1993 | Kotani | 358/407 |
| 5,189,696 | 2/1993 | Yoshida | 379/355 |
| 5,204,895 | 4/1993 | Yoshiura | 379/100 |
| 5,216,517 | 6/1993 | Kinoshita et al. | 358/400 |
| 5,216,519 | 6/1993 | Daggett et al. | 358/434 |
| 5,216,705 | 6/1993 | Yoshida et al. | 379/100 |
| 5,228,128 | 7/1993 | Kim | 395/275 |
| 5,235,595 | 8/1993 | O'Dowd | 370/94.1 |
| 5,241,589 | 8/1993 | Jefferson | 379/355 |
| 5,260,991 | 11/1993 | Ikegaya | 379/100 |
| 5,267,307 | 11/1993 | Izumi et al. | 379/354 |
| 5,272,749 | 12/1993 | Masek | 379/216 |
| 5,278,665 | 1/1994 | Sawada et al. | 358/442 |
| 5,280,516 | 1/1994 | Jang | 379/57 |
| 5,282,202 | 1/1994 | Bernstein et al. | 370/94.1 |
| 5,282,238 | 1/1994 | Berland | 379/58 |
| 5,287,202 | 2/1994 | Kumarappan | 358/440 |
| 5,289,533 | 2/1994 | Wasio et al. | 379/100 |
| 5,289,536 | 2/1994 | Hokari | 379/221 |
| 5,291,302 | 3/1994 | Gordon et al. | 358/400 |
| 5,295,244 | 3/1994 | Dev et al. | 395/161 |
| 5,299,257 | 3/1994 | Fuller et al. | 379/100 |
| 5,305,372 | 4/1994 | Tomiyori | 379/59 |
| 5,315,649 | 5/1994 | Foster et al. | 379/355 |
| 5,323,398 | 6/1994 | Wake et al. | 370/110 |
| 5,329,580 | 7/1994 | Yoshino | 379/90 |
| 5,337,349 | 8/1994 | Furohashi et al. | 379/100 |
| 5,339,174 | 8/1994 | Harris | 358/442 |
| 5,347,516 | 9/1994 | Yoshida | 370/94.1 |
| 5,381,240 | 1/1995 | Murayama | 358/436 |
| 5,410,416 | 4/1995 | Amberg et al. | 358/405 |
| 5,425,023 | 6/1995 | Haraguchi et al. | 370/401 |
| 5,426,692 | 6/1995 | Fujise | 379/93 |
| 5,444,707 | 8/1995 | Cerna et al. | 370/94.1 |
| 5,490,199 | 2/1996 | Fuller et al. | 379/1 |

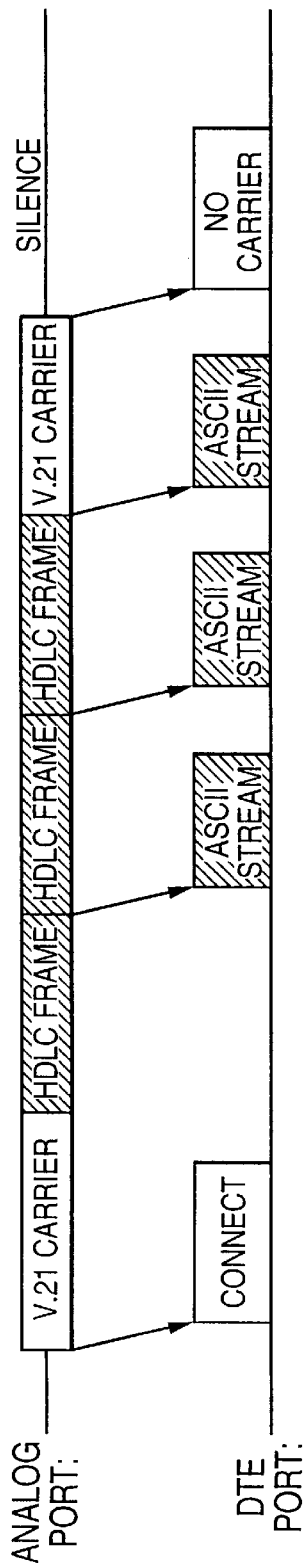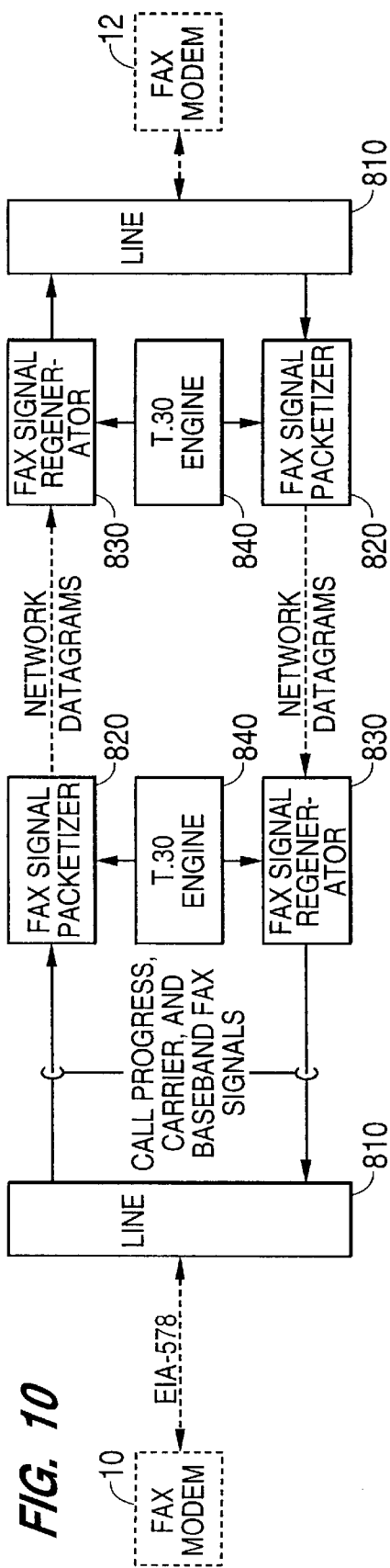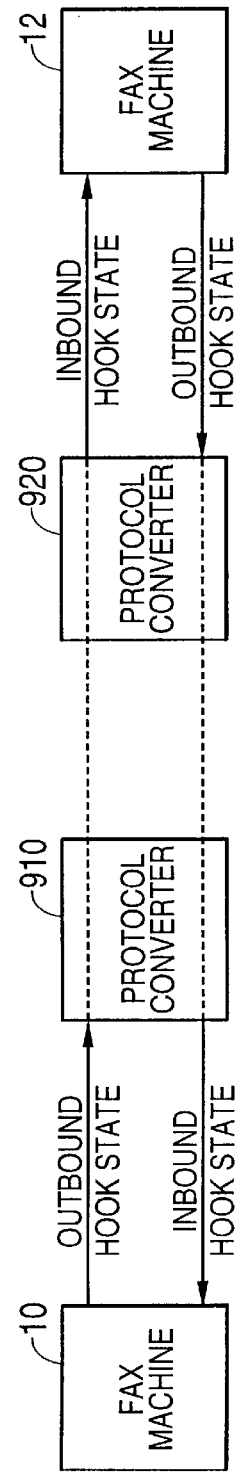
FIG. 9
FIG. 10
FIG. 11

POINT OF PRESENCE (POP) FOR DIGITAL FACSIMILE NETWORK WITH VIRTUAL POPS USED TO COMMUNICATE WITH OTHER NETWORKS

RELATED APPLICATIONS

This application is related to applications entitled "Point of Presence (POP) for Digital Facsimile Network", Ser. No. 08/649,571 filed May 17, 1996, now U.S. Pat. No. 5,739,19; "Point of Presence (POP) for Digital Facsimile Network With Spoofing Capability to Maintain Fax Session", Ser. No. 08/649,237 filed May 17, 1996, now U.S. Pat. No. 5,828,468; "Facsimile Jack for Selectively Routing a Transmission through a Facsimile Network", Ser. No. 08/649,209 filed May 17, 1996; "Apparatus and Method for Transmitting Facsimile Data", Ser. No. 08/649,237 filed May 17, 1996; "Method of Routing a Data Transmission", Ser. No. 08/649,208 filed May 17, 1996, now U.S. Pat. No. 5,815,669; and "Method of Monitoring a Data Transmission", Ser. No. 08/649,202 filed May 17, 1996; all of which are filed concurrently with this application, and all of which are incorporated herein by reference.

BACKGROUND OF THE INVENTION

1. Field of the Invention

The invention relates to a fax transmission system which uses both digital communications lines and conventional analog communications via public switched telephone network to determine an appropriate path for a fax transmission. In particular, the invention relates to a point-of-presence (POP) which is used to packetize fax data received via analog telephone lines, and then send the packetized data over a digital communications line to another POP, which then unpacketizes the data to be sent to a destination fax machine. In the above-described system, virtual POPs are used to communicate with devices on other networks.

2. Description of the Related Art

When a facsimile is transmitted using conventional systems, the data is transmitted entirely through voice grade, analog telephone lines. A typical facsimile transmission route is shown in FIG. 1. A source facsimile device 10 dials a phone number for a destination facsimile device 12. The call is routed through a telephone jack 20 to a local exchange carrier at a central office (LEC CO) 30. Subsequently, a connection is made from the LEC CO 30 to a local interexchange carrier's point of presence (IXC POP) 40. The local IXC POP 40 makes a connection through a long distance carrier facility 50 to a destination IXC POP 42 which in turn makes a connection to a destination LEC CO 32. The destination LEC CO 32 then rings the phone number for the destination facsimile device 12. Once the destination facsimile device 12 answers, an end-to-end connection is established between the two facsimile devices 10, 12. The appropriate facsimile session setup is then performed by the two facsimile devices 10, 12, and is followed by the facsimile data transmissions. Upon completion of the facsimile transmission, the facsimile devices hang-up and the connection is terminated.

In FIG. 1, the connection between the two LEC CO's 30, 32 is illustrated as being through a cloud 60. The cloud 60 is conceptually nothing more than a mechanism by which a source LEC CO 30 communicates with a destination LEC CO 32. How this is accomplished is not important other than to point out that it is a network of communications which allows point to point communications for devices on the network. The communications medium can be copper wire, fiber optic cable, satellite link, or microwave link. It behaves as a virtual wire from one place to another.

In the conventional system as illustrated in FIG. 1, when one facsimile device dials another, a circuit-like connection is created between the two devices. Data is then transmitted between the devices in real-time. In other words, there is virtually no delay from the time when the source facsimile device 10 sends data to the time when the destination facsimile device 12 receives the data.

Further, in the conventional system, telecommunications services (phone lines, etc.) used for facsimile transmissions, and their associated cost structure, are formally defined by the carrier in a document called a tariff. Tariffs are filed for approval by state regulatory commissions and/or the Federal Communication Commission (FCC).

There are also store and forward services available for transmitting facsimile information. With store and forward, the facsimile information is generally transmitted to a local vendor with information about the final destination. The local vendor then takes responsibility for delivering the facsimile. Such services are not real-time in that there is no circuit-like connection between the source and destination facsimile devices. In such systems, the facsimile transmission is usually sent at a later time when the rates are less. A disadvantage of such systems is that in the event a facsimile cannot be delivered to the destination facsimile device, there may be no reliable way of notifying the user of the source facsimile device that the facsimile has not been delivered. Important facsimiles requiring immediate delivery and confirmation of receipt generally cannot be sent through such systems.

As described above, facsimile transmissions today are accomplished through the use of analog grade circuits. The bandwidth of analog voice grade circuits is however very small and so telephone companies have migrated their equipment to provide their transmission services using a digital network. Nevertheless, access to the digital network is still made through voice grade lines and thus facsimile transmissions still need to be converted from analog to digital. To faithfully reproduce an analog voice transmission requires a digital bandwidth of 56 Kbps. Thus, 56 Kbps of bandwidth must be reserved for every voice chanel to be carried over the digital medium. Utilizing an analog signal, facsimile over a voice grade line is currently limited to sending the equivalent of 14.4 Kbps, thereby wasting a minimum of 41.6 Kbps. As a consequence, when a facsimile is sent over a voice grade circuit through the network's digital transmission facilities, most of the bandwidth is not utilized even though it is being paid for.

An example of the above-described digital network is shown in FIG. 2, and corresponds to a system recommended in a document published by The International Telecommunications Union (ITU, formerly "CCITT"). In the ITU system, data is transmitted digitally between a source facsimile packet assembly/disassembly facility (FPAD) 44 and a destination FPAD 46 through a Packet Switched Public Data Network (PSPDN) 51. The access to either FPAD 44 or 46 is still made through its respective General Switched Telephone Network (GSTN) 31 or 33. The CCITT system has some technical characteristics, however, which make it unattractive, particularly for facsimile transmissions. They are:

1. It runs on X.25 protocol which significantly increases the length of call.
2. It does not guarantee delivery of data.
3. It has a variable delay in delivery of communicated packets.
4. It does not accommodate switched analog access lines.

SUMMARY OF THE INVENTION

An object of the invention is to provide an apparatus for routing facsimile transmissions over a digital facsimile network.

It is also an object of the invention to provide a spoofing capability to keep a fax link operational while messages are passed from a sending fax machine to a receiving fax machine over a digital network.

It is a further object of the invention to provide an apparatus for determining if a fax transmission can be provided over a digital network, and if not, then informing the sending fax machine to send the fax transmission over a conventional analog network.

It is still a further object of the invention to provide a gateway to communicate with other networks by using point of presences in a virtual mode.

These and other objects of the invention may be accomplished by a system for use in a digital network for providing control of data transmissions from a transmitting data device to a receiving data device over the digital network. The system includes a plurality of point of presences (POPS) connected on the digital network and each located in a corresponding predetermined area and each configured to receive requests for data transmissions from devices within the corresponding predetermined area over a local exchange carrier operating in the corresponding predetermined area. Each of said POPs has means for transferring data in packetized format over the digital network to other of said POPs, wherein at least one of the POPs is configured to provide a path to a second network separate and distinct from the digital network. Further, at least one of the POPs provides a transparent interface for data transfer from the transmitting data device to the receiving data device over the digital network and the second network.

The above-described objects are also accomplished by a system for sending digital data from a sending device to a receiving device over a first and a second network. The system includes a first point of presence connected to the sending device over a first local exchange carrier and connected on the first network. The first point of presence is configured to convert data received from the sending device over the first local exchange carrier into packets of data to be sent over the first network. The system also includes a virtual point of presence connected on the first network and the second network and configured to receive the packets of data sent from the first point of presence and to transfer the packets of data onto the second network. The system further includes a second point of presence connected on the second network and configured to receive the packets of data on the second network and to send the packets of data to the receiving device of a second local exchange carrier connecting the second point of presence to the receiving device.

BRIEF DESCRIPTION OF THE DRAWINGS

For a description of an apparatus and method according to the invention, reference is made to the following description and accompanying drawings, in which:

FIG. 9 illustrates the conversion of a typical 3-frame command or response;

FIG. 10 illustrates four objects used in fax signal conversion to appropriately pack and unpack a baseband fax signals into and out of datagrams for transmission through the frame relay network according to the preferred embodiment of the invention;

FIG. 11 shows a simple way to handle the exchange of hangup supervision according to the preferred embodiment of the invention;

DETAILED DESCRIPTION OF THE PREFERRED EMBODIMENTS

In conventional facsimile transmission systems, a user's long distance fax transmission is automatically routed to their chosen inter-exchange carrier (IXC) at the local exchange carrier central office (LEC CO). In the system according to the invention, a user is provided access to a non-tariffed, packet-switched data network in lieu of the conventional analog transmission available from the long distance voice networks for fax transmission, which requires selectively redirecting a long distance fax call before it is directed to a long distance carrier.

Figure 2:
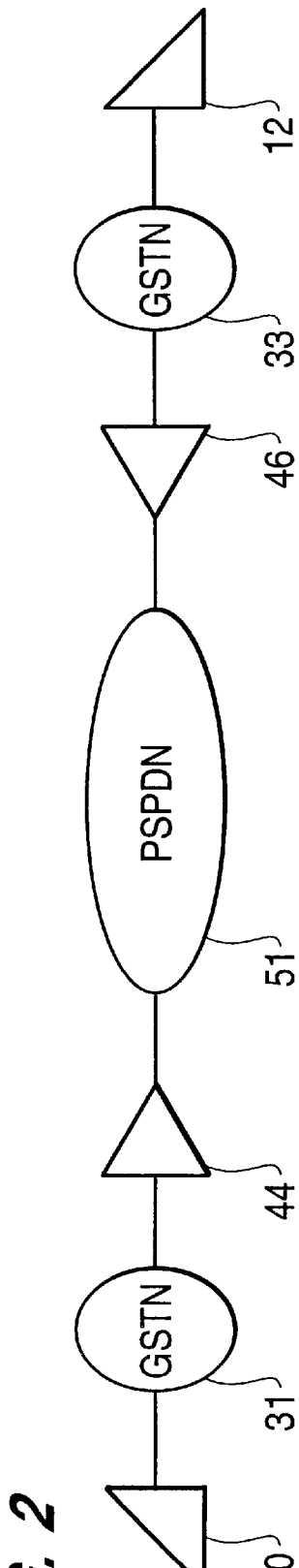
FIG. 2 shows a digital network used to send fax data therethrough based on the ITU recommendation.

The selective redirection is accomplished by the use of a device, a "FaxJack™" (also called "FJ" and "Facsimile Jack" in this application and related applications), between the sending fax device and the RJ-11 telephone outlet. The FaxJack re-routes calls from the customer's normal long distance carrier and instead the fax transmission is sent through a packet switched digital network. FIG. 2 shows the packet switched network utilized to send data therethrough, in which a FaxJack (to be described later) is not utilized.

FIG. 2 illustrates an alternative to using voice grade telephone lines. Voice grade lines are subject to tariffs. In the system of FIG. 2, data is transmitted using an X.25 data transmission scheme, which is a purely digital form of data transmission. With X.25, instead of the data being transmitted through voice grade lines, it is communicated using digital lines 51. The data is transmitted digitally between the FPAD 44 and the FPAD 46.

Analog lines are still used to communicate from the source facsimile device 10 to the FPAD 44 and the FPAD 46 and the destination facsimile device 12. The reason for using digital communications between the FPADs 44, 46 is that the cost of transmitting digital data is significantly less than analog data.

Figure 3:
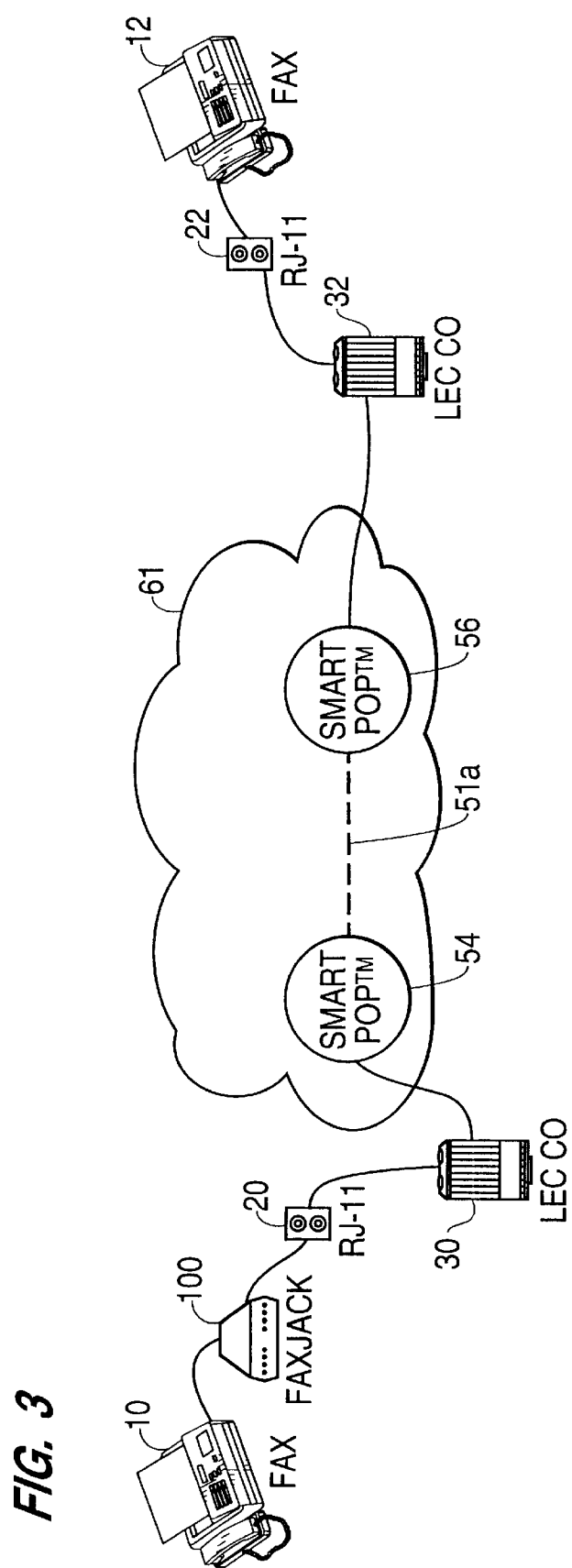
FIG. 3 shows a packet switched network used to send fax data therethrough using a FaxJack™ and a SmartPOP™ according to the preferred embodiment of the invention.

FIG. 3 shows a fax transmission setup using a FaxJack 100, a source POP 44a (SmartPOP™ 44a), and a destination POP 46a (SmartPOP™ 46a) according to the preferred embodiment of the invention. In FIG. 3, the packets of data are sent over a frame relay network 51, but alternatively the digitized data can be sent by other digital data transport methodologies, such as via asynchronous transfer mode (ATM). The system of FIG. 3 provides about 20–30% shorter transmission times than the system of FIG. 2, as well as much better relability of data transmission.

In FIG. 2, the source POP 44 and the destination POP 46 act as interface adapters for passing data between the conventional analog voice-grade lines of the local exchange carrier and the digital network 51. The source SmartPOP 44a and the destination SmartPOP 46a of FIG. 3 are more sophisticated systems, and provide additional functions to maintain the fax transmission, such as spoofing, protocol conversion and system maintenance, as will be described in more detail hereinbelow.

Details on the digital/analog fax communications system, the FaxJack and the FaxJack software used in the network of FIG. 3 are respectively provided in the related applications entitled "Facsimile Jack for Selectively Routing a Transmission through a Facsimile Network", serial number (unassigned), attorney docket number 75488/104; "Apparatus and Method for Transmitting Facsimile Data", serial number (unassigned), attorney docket number 75488/105; "Method of Routing a Data Transmission", serial number (unassigned), attorney docket number 75488/103; and "Method of Monitoring a Data Transmission", serial number (unassigned), attorney docket number 75488/110.

Figure 1:
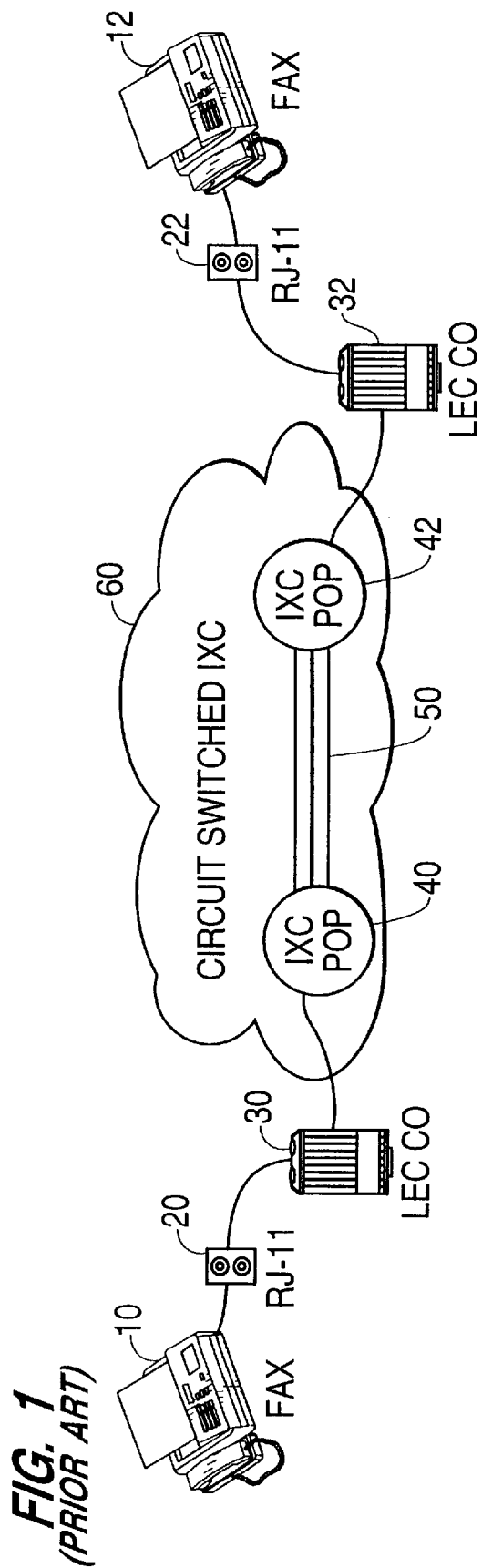
FIG. 1 is a diagram of a conventional fax transmission system.

In the conventional system, as shown in FIG. 1, a user's long distance facsimile transmissions are automatically routed to their chosen IXC POP by the LEC Co. Further, using the system provided in FIG. 2, a user's long distance facsimile transmissions are automatically routed to the packet switched network 51, without having a means for providing a secondary connection in case the digital network cannot service the fax request.

Providing user access to a packet switched POP requires selectively redirecting their long distance calls before they are directed to their long distance carrier. To allow such selective redirection, a facsimile jack (or "FaxJack") 100 according to the invention is provided between the source facsimile device 10 and the telephone jack 20 (see FIGS. 3 and 4).

The FaxJack 100 re-routes calls from the source facsimile's normal long distance carrier through the packet switched digital network 51 of FIG. 3. A principal purpose of the FaxJack 100 is to redirect calls made by the attached facsimile device and transmit them over the packet switched digital network 51. Redirection of calls is transparent to the user. In other words, from a user's perspective, facsimile transmissions are sent and received the same way after the FaxJack 100 is installed as it was before it was installed. The FaxJack 100 decides on a call by call basis whether a call should be directed through the packet switched digital network. In order to do this, the FaxJack 100 stores the area codes and corresponding exchanges of those areas serviced by the network in a non-volatile memory. The FaxJack 100 also provides additional functionality which is transparent to the user, such as collecting data on all incoming and outgoing facsimile sessions.

Additionally, the data and the software in the FaxJack 100 is updated remotely by the source SmartPOP 44a. This allows for software updates and additional features to be added over time. It also allows for downloading of network directories and uploading of statistical information to the network.

The redirection of facsimile transmissions is performed by the FaxJack 100 in the following manner. A user at the source facsimile device 10 places documents to be facsimiled into the source facsimile device 10 and keys in the phone number of the destination facsimile device 12. The source facsimile device 10 then issues an off-hook signal to gain control of the phone line. The FaxJack 100 detects the request for the off-hook and takes the phone off-hook and connects the receive channel of the phone line with the source facsimile device 10. The source facsimile device 10, detects the dial tone and initiates dialing. Instead of the digits being dialed transmitted directly to the LEC Co 30, they are intercepted by the FaxJack 100. The FaxJack 100 then determines if the number being dialed can be serviced by the network. If the number is not serviced by the digital facsimile network, the FaxJack hangs up and attempts to route the call through a secondary alternate network (VPN, WATS, etc.). If the number is not serviced by the secondary alternate network or if the call cannot be completed, the FaxJack hangs up and dials the original number to the LEC. All of these steps are invisible to the facsimile device connected to the FaxJack.

Once connected to the source SmartPOP 44a, the FaxJack 100 communicates setup information using data modem protocols and signalling, such as the serial number of the FaxJack 100 and the destination phone number. At this point, the FaxJack 100 and the source SmartPOP 44a are in communication with each other and can communicate additional data if necessary. After the source SmartPOP 44a has verified that the FaxJack 100 is registered, it connects to a destination SmartPOP 46a which is servicing the destination facsimile phone number. The number being dialed is passed to the destination SmartPOP 46a and the destination facsimile device 12 dialed. After connecting and communicating initial facsimile device setup parameters, the destination SmartPOP 46a notifies the source SmartPOP 44a that it has made a successful connection with the destination facsimile device 12. If the destination facsimile device 12 cannot be accessed by the destination SmartPOP 46a (e.g., the phone number of the destination facsimile device 12 is busy, out-of-service, or a human voice answers the phone), then this "unable-to-connect" information is passed on to the source SmartPOP 44a and then to the source facsimile device 10, which may try again at a later time.

At this point, if a successful connection has been made to the destination facsimile device 12, the Faxjack 100 connects the transmit signal of the source facsimile device 10 to the outside phone line and the source facsimile device 10 begins to transmit data using facsimile modulation, signalling, and protocols. Note that in this facsimile mode, the data modulation, signalling and protocols used to previously communicate the setup information are not used. The data from the source facsimile device 10 is received as analog signals by the source SmartPOP 44a and then digitized and transmitted as packets to the destination SmartPOP 46a. The digitized packets are received and recombined by the destination SmartPOP 46a and converted back to analog signals. These analog signals are then sent to the destination facsimile device 12. Information communicated between the destination facsimile device 12 and the source facsimile device 10 is also carried out in the same manner. It is possible for devices which transmit facsimiles without the use of facsimile machines, e.g., computers, to implement the functional equivalent of the FaxJack 100 in software.

Unlike conventional systems described earlier, the rasterized data making up the fax transmission that is sent from the sending fax device, and which is received as an analog signal by the source SmartPOP 44a, is digitized by the source SmartPOP 44a. Once digitized, this data is packetized and transmitted as separate packets of data to the destination SmartPOP 46a over the digital network 51 connecting the SmartPOPs with each other. The digitized packets are received and recombined by the destination SmartPOP 46a and converted back to analog signals. These analog signals are then sent to the destination fax device 12 over a local analog telephone line that connects the destination SmartPOP 46a with the destination fax device 12. Information communicated sent from the destination fax device 12 to the source fax device 10, such as acknowledgement signals and other types of signals required by the fax protocol, are also communicated in the same manner as described above.

A key feature of the system according to the invention is the SmartPOP. SmartPOPs perform data conversion to carry group 3 (G3) or group 4 (G4) fax traffic over a frame relay based network. To perform this task, data processing equipment is co-located with the SmartPOP at both the source and destination sides. Preferably, SmartPOPs are deployed over the entire area to be serviced by the digital network. A Network Operations Center (NOC) is also used to monitor and maintain the SmartPOPs from both a hardware and a software perspective. The NOC is described in a related application which has been incorporated herein by reference, and is not considered directly pertinent to understanding the invention claimed herein.

Figure 4:
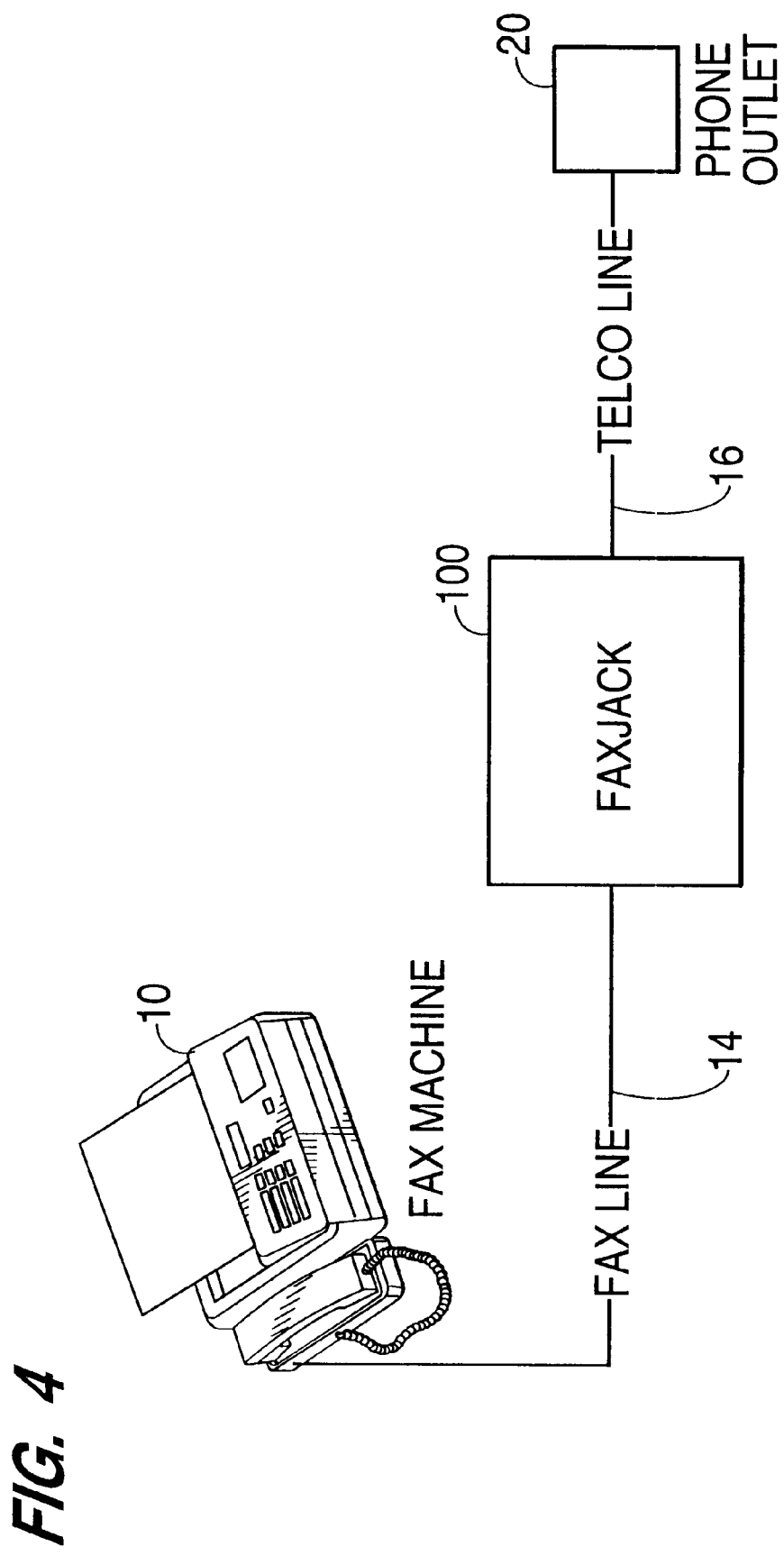
FIG. 4 illustrates the connection of a FaxJack to a phone outlet and to a fax device that is used with the SmartPOP according to the preferred embodiment of the invention.

The connection of a FaxJack 100 to a phone outlet 20 and to a fax device 10 is shown in FIG. 4.

Figure 5:
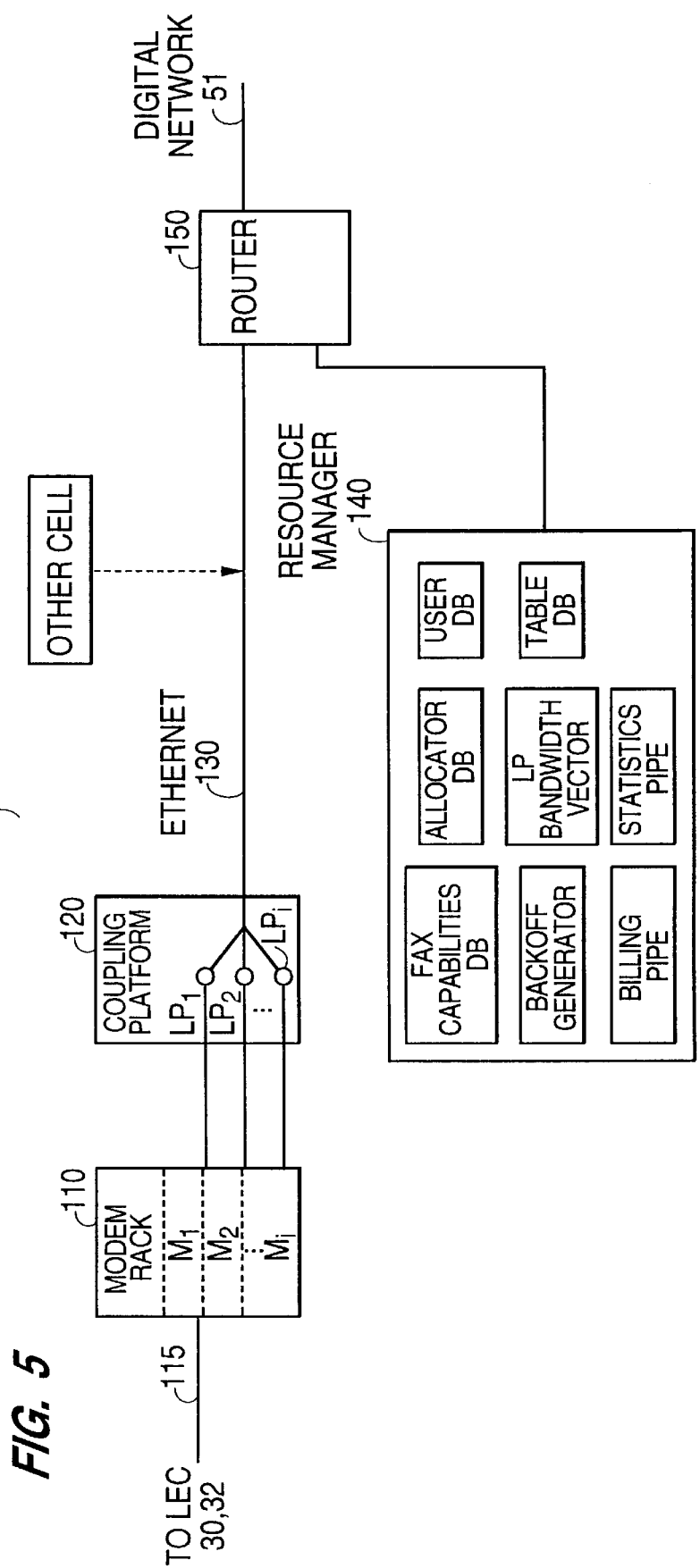
FIG. 5 is a block diagram of a SmartPOP according to the preferred embodiment of the invention.

A SmartPOP 44a, 46a is shown in FIG. 5. The SmartPOP includes a modem rack 110 which contains a plurality of modems $M_1, M_2, \ldots, M_i$ that are connected on one end to a high capacity line 115 (e.g., T1/E1 interface) that connects the SmartPOP with a local exchange carrier 30, 32. It is through this high capacity line that the SmartPOP receives requests for fax transmission from fax devices in the locality that the SmartPOP is situated. It is also over this high capacity line that the SmartPOP sends fax data received from another SmartPOP to a fax device in the locality that the SmartPOP is situated.

The modems $M_1, M_2, \ldots, M_i$ used in the SmartPOP 44a, 46a in the preferred embodiment of the invention have several special characteristics in order to maintain the fax session. The modems used in the SmartPOPs 44a, 46a have to maintain a telephone connection to the FaxJack in both a data mode and a fax mode, without hanging out the telephone line. The data mode is used to set up the fax session, to maintain the fax session, and to change parameters used in the fax session, and can be entered at any point during the fax session. Thus, the modem is configured to switch between the fax mode and the data mode as many times as necessary during a telephone connection between a source device and a destination device. The modems in the SmartPOPs 44a, 46a include a processor (not shown) and a memory (not shown) for storing a computer program that is executed by the processor in order to maintain the telephone connection while switching between the fax mode and the data mode. The modems in the SmartPOPs 44a, 46a also include a timer (not shown) for counting a period of time that a digital indication can be received from the destination device after receipt of a voice transmission and still maintain the telephone connection between the source and destination devices.

The modems $M_1, M_2, \ldots, M_i$ in the modem rack 110 are shown in FIG. 5 as having a direct T1/E1 interface to the FaxJack. The direct T1/E1 interface supports Feature Group Access, PRI, ANI, DNIS, and Caller ID signaling. The modems in the SmartPOPs 44a, 46a also have a DTE interface, which in the preferred embodiment is capable of supporting data rates of up to 115 Kbps. The modems in the SmartPOP 44a, 46a support EIA-578 command sets (Class 1 fax commands. Each of the modems in the SmartPOPs 44a, 46a has a management interface (not shown) that is provided for monitoring the status of the respective modems. The modems further have the capability of being updated via software commands received over their respective input ports. An important feature of the modems is that they can switch from either a voice mode or a data mode to a fax mode without causing a hanging up of the line.

The modems perform an initial data session with the FaxJack, followed by a fax session. Accordingly, in switching between data and fax modes, the modem, as part of the SmartPOP, does not cause or allow the line to be hung up or disconnected. When the fax session begins, control over the answer tone is provided. The requirement not to go off-hook between different data modes is implemented so that any number and sequence of distinct data or fax operation sessions can be made during the course of one call, without redialing. One method would be to end the data session with an in-band escape to a command mode with no guard time. This can be implemented by the following commands: AT+FCLASS=0 OK . . . RING . . . ATA CONNECT . . . data session +++ OK AT+FCLASS=1 OK. The modem will drop the carrier but not the hookswitch. Following this, it is desired to specify the precise moment that the answer tone will be generated (if any): AT+FCED. The modem immediately emits a fixed frequency (i.e. 2100 Hz) CED tone (OK AT+FTS=n). The modem emits silence for a predetermined time period (OK AT+FTS=3). The modem then raises the V.21 carrier (CONNECT). The data frames then can follow (i.e., NSF/CSI/DIS frames). The need to maintain an on-hook condition between different data modes is implemented in the modem so that any number and sequence of distinct data or fax operation sessions can be made during the course of one call, without the necessity of redialing.

In each of the modems, the time required for incoming trunk seizure signaling to the initial data arriving on the DTE interface from the caller is minimized by providing a non-ITU-T answer sequence option. When this option is enabled, the V.25 answer tone and any ITU-specified train-up sequence is bypassed. In the preferred embodiment, for V.22bis, the answering modem presents a scrambled binary 1 for 200 milliseconds before allowing data to be transmitted, and the originating modem does likewise after detecting 32 consecutive bits of scrambled binary 1 from the answering modem. The skipping of the answer tone and the train-up sequence is implemented for all supported modulations.

The detection of an answer tone is implemented during an originating fax call by the modem in the destination SmartPOP 46a, and a non-EIA response (called "CED") is provided by the target facsimile device to report the detection of the answer tone. In the preferred embodiment, the non-EIA response is returned within 100 milliseconds after a 2100 Hz tonal signal is presented to the originating fax modem during a call (i.e., ATDT555-1234 CED CONNECT). An S-register bit can be used to enable and disable this feature.

The modems are also provided with a Service Information Tone (SIT) discrimination function. SITs are special call progress tones that indicate a network condition that resulted in a failure to place a call (i.e., boo-baa-beep, We're sorry, your call cannot be completed as dialed). There currently are eight different SIT combinations, any two of which may be returned after dialing. The SITs differ by varying the frequency and duration of the first two tones. When a SIT is detected, the modem returns a response and immediately hangs up on the recorded message (i.e., "the number that you have dialed is not in service"). This is implemented by the command ATDT555-1234 SITn, where n is an integer between 0 and 7, depending on the SIT. The different types of SITs are described in "BOC Notes on the LEC Networks", 6.23.2, p. 6–321.10, which is incorporated herein by reference.

The EIA command set for the modem supports line-side terminals. As a consequence, only outward hangup supervision can be generated, and inward hangup supervision is implied by the loss of a carrier. Thus, explicit inward supervision is provided by a pre-specified indication, which is either a modem response string (i.e., HANGUP) or a signal change on the DTE interface.

For the modems used in the SmartPOPs 44a, 46a, if a modem indicates that a human operator has answered the phone by issuing a VOICE response, it does not hang up the line as a result of receiving the voice. This is the case since in certain situations, the fax line is also used as a normal voice line by certain fax operators, and so the voice indication may still allow for an operator to switch over to the fax mode. As a result, the modems continue with the call as if voice was not detected. The modems also support non-buffering of HDLC frame data as a configuration option. When this option is selected, a modem returns the HDLC frame bytes to the DTE as they are received. The modem returns FCS bytes, followed by a stream terminator (<DLE><ETX>), and then proceeds to perform a cyclic redundancy code (CRC) check. The result code following the stream terminator reflects the result of the CRC check. The modems also have the capability of fast V.21 carrier detection and generation. The modem's latency in detecting a V.21 carrier after a +FRH command and the presentation of the V.21 carrier is 50 milliseconds or less in the preferred embodiment. The latency in raising the V.21 carrier after a +FTH command is also less than 50 milliseconds in the preferred embodiment.

Figure 6:
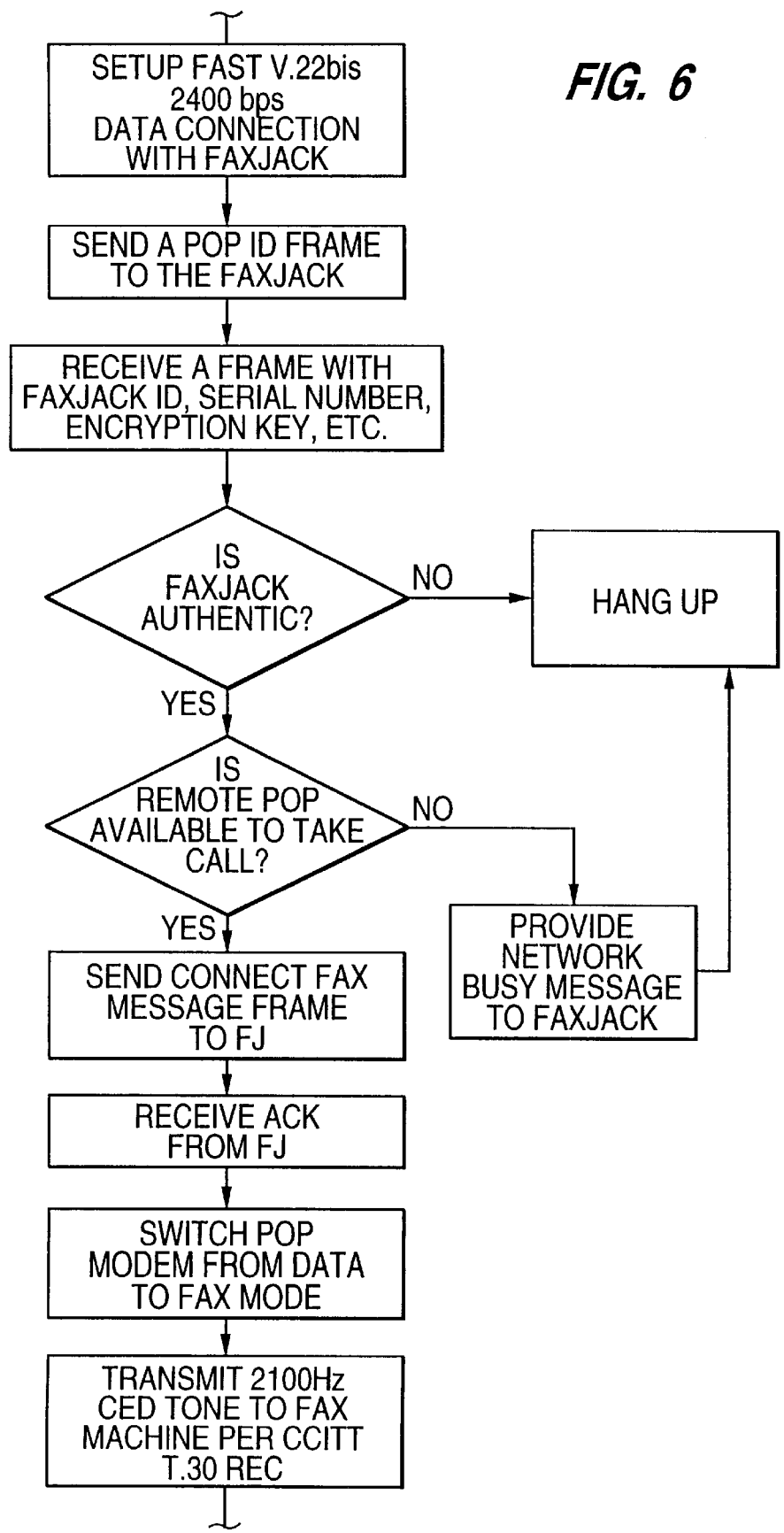
FIG. 6 is a flow diagram of a call setup procedure between a FaxJack and a SmartPOP according to the preferred embodiment of the invention.

A flow diagram of a call setup routine performed by the SmartPOP is shown in FIG. 6. In step 400, a setup fast V.22bis, 2400 bps data connection is made with the FaxJack based on a call setup request previously received from the FaxJack. In step 410, a POP ID frame is sent by the SmartPOP to the FaxJack. In step 420, the SmartPOP receives a frame from the FaxJack which includes the FaxJack ID, serial number, encryption key, etc. In step 430, a determination is made as to whether the FaxJack is authentic. If no, control proceeds to step 440, in which case the SmartPOP hangs up on the FaxJack. If yes, control proceeds to step 450. In step 450, a determination is made as to whether there is a remote SmartPOP available to take the call. If no, control proceeds to step 460, in which a "network busy" message is sent to the FaxJack. If yes, control proceeds to step 470, in which a "connect fax" message is sent to the FaxJack. In step 480, the modem at the SmartPOP is switched from a data mode to a fax mode. In step 490, a 2100 Hz CED tone is transmitted by the faxsimile device per CCITT T.30 requirement.

Figure 7:
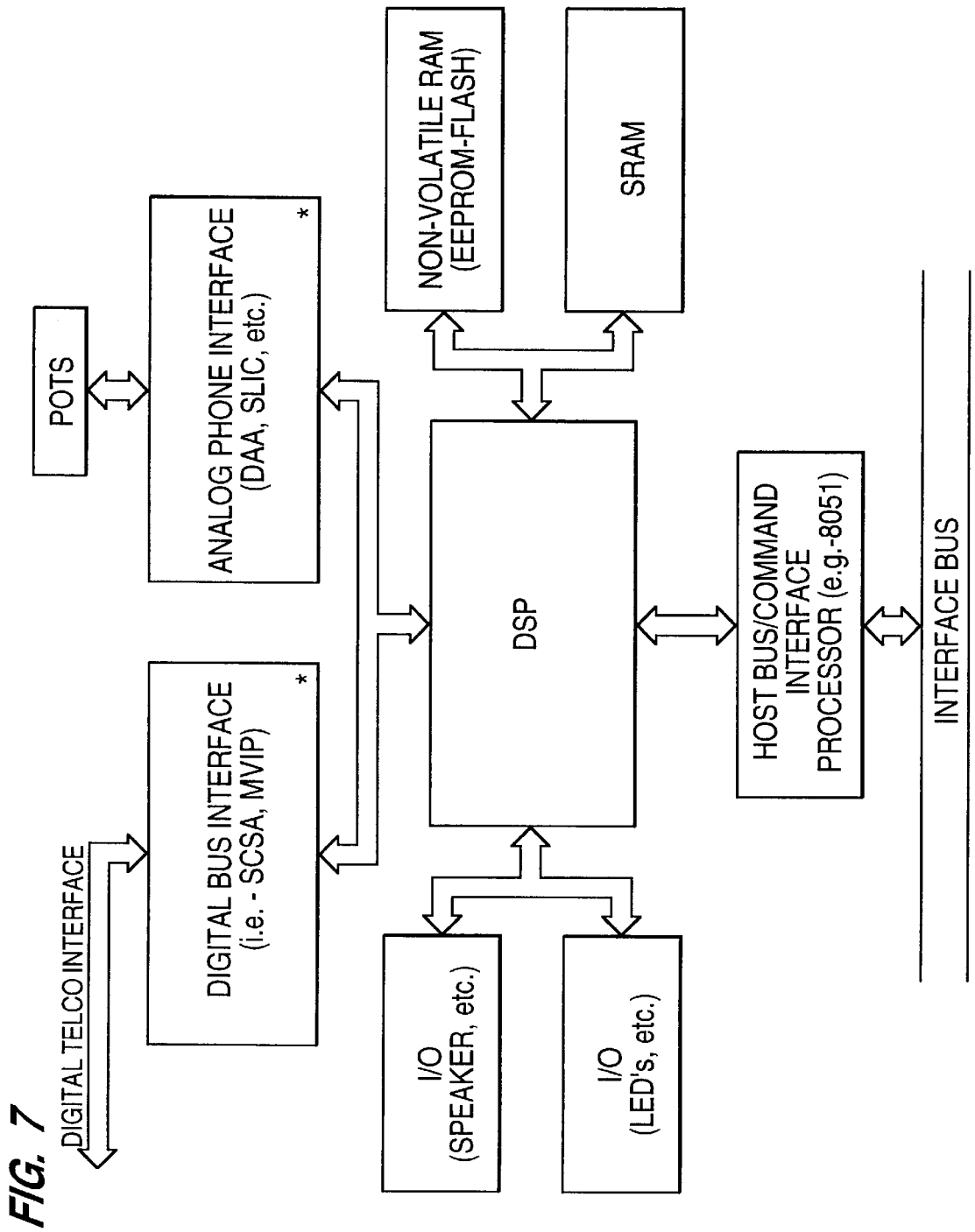
FIG. 7 is a block diagram of a switchable modem according to the preferred embodiment of the invention.

FIG. 7 is a block diagram of a switchable modem that can be used in the SmartPOP. The switchable modem includes an analog phone interface 700 that is connected to the plain old telephone system (POTS). The switchable modem also includes a digital bus interface 710 (i.e., SCSA, MVIP), which is connected to a digital telco interface. Both the analog phone interface 700 and the digital bus interface 710 are connected to a digital signal processor (DSP) 720 via a bi-directional bus 725. The DSP 720 is also connected to a non-volatile RAM 730 (i.e., EEPROM—Flash) and to a Static RAM (SRAM) 740 via a bi-directional bus 745. The DSP 720 is further connected to a host bus/command interface processor 750 (i.e., 8051) via a third bi-directional bus. The host bus/command interface processor 750 is also connected to an interface bus 760. The DSP 720 is connected to an I/O devices 770 and 780, which may include a speaker, LEDs, etc.

Referring back to FIG. 5, each of the modems $M_1$, $M_2$, ..., $M_i$ is connected to a corresponding line processor (LP). Each of the line processors are shown as being housed in a coupling platform 120. In the preferred embodiment, the line processors in one cell of the SmartPOP communicate with line processors in other cells of the SmartPOP via an ethernet interface 130. The line processors also communicate with a resource manager 140 of the SmartPOP via the ethernet interface 130. As will be described in more detail herein, each SmartPOP can have more than one resource manager, with one resource manager for each cell making up a SmartPOP. Each resource manager is used by a plurality of line processors, and for each SmartPOP, its resource manager(s) contain the same data to ensure uniformity. The resource managers for one SmartPOP communicate with each other over a dedicated LAN segment (not shown), in which they maintain data integrity and data exactness between the resource managers. The resource manager includes several databases, which include: a) backoff generator, b) user database, c) table database, d) allocator database, e) fax capabilities database, f) billing pipe, and g) statistics pipe. Each of these databases will be described in detail hereinbelow. The SmartPOP also includes a router 150 which routes traffic to and from the digital network 51.

Figure 8:
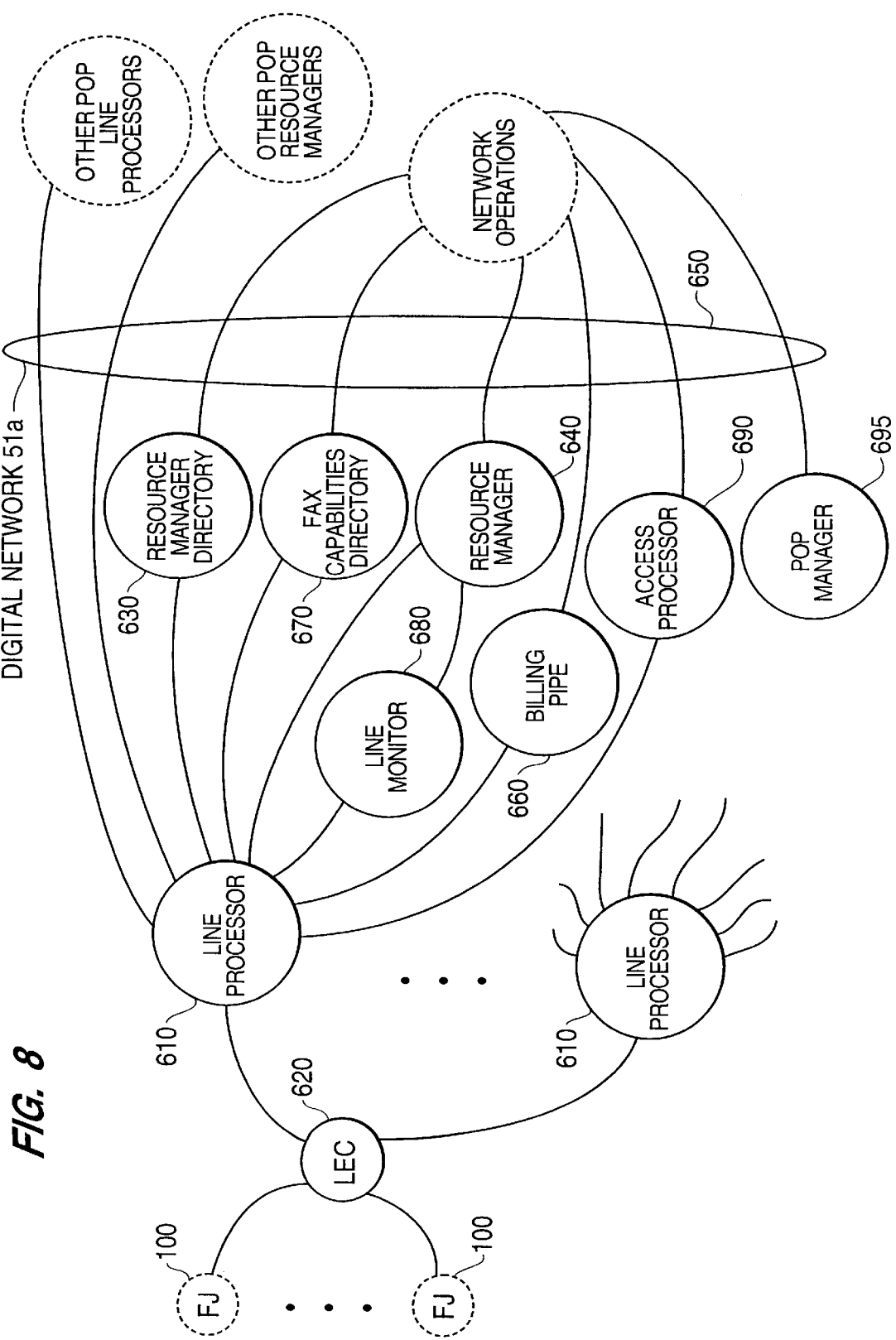
FIG. 8 is a block diagram showing the connectivity of the components making up a SmartPOP.

The SmartPOP is where equipment that supports the digital fax network is located. SmartPOPs are ideally distributed throughout the fax transmission area, and are preferably located along with equipment for the local exchange carrier, LEC. SmartPOPs are connected to each other via Permanent Virtual Circuits, PVCs. PVCs are nothing more than physical communications channels that are dedicated to the digital network for providing systems communications. A block diagram showing the connectivity of the components making up a SmartPOP is shown in FIG. 8. In FIG. 8, the SmartPOP is connected to FaxJacks in its locality via a local exchange carrier (LEC).

The SmartPOP is provided with a plurality of line processors (LP) 610 for each line connection with the LEC. The LPs 610 field incoming calls from the LEC 620 and run an access state machine which verifies the authenticity of the Faxjack making the incoming call. Once verified, the LP 610 that receives the call accesses the Resource Manager Directory 630 in order to determine the location of a SmartPOP that services the calling area of the destination fax device. Once it has retrieved that address from the Resource Manager Directory 630, the LP 610 contacts the resource manager (RM) 640, via the IXC 650, of the destination SmartPOP to determine if there is an available LP to route the fax call through to the destination fax device. If there is such an available LP at the destination SmartPOP, the LP 610 at the source SmartPOP conducts the fax session protocol to complete the fax transmission and to end the fax session. After completion of the transmission, the LPs at both the source and destination SmartPOPs generate a complete record of the transaction and store that information in the Billing Pipe (BP) 660 of their respective resource manager directories. The LP 610 also performs any scheduled statistical or configuration data transfers with the FaxJack, when necessary. Also shown in FIG. 8 is a Fax Capabilities Directory 670, a line monitor 680, an Access Processor 690, and a SmartPOP Manager 695, which will be described in more detail further herein.

The LP is responsible for answering incoming calls, mediating the FaxJack session, coordinating the setup of a terminating LP at a destination SmartPOP, performing the T.30 fax communications protocol, and generating reports after a fax session has completed. There is one LP per LEC line. The LP encapsulates the communications hardware implementation, whether it is a E1A fax modem, a DSP board, or the like.

The LP Allocator in the Destination SmartPOP 46a is contacted by the originating LP (source LP) in the Source SmartPOP 44a. The LP Allocator determines if an LP in the Destination SmartPOP 46a is available, and then signals the address of the available LP to the source LP. If an LP is not available at the Destination SmartPOP 46a, then the LP Allocator contacts other LP Allocators (through the RM) to determine if an LP is available there. If no LP is available, then this information is signalled back to the source LP. The LP Allocator performs the allocation function using local information at the terminating side of a call (that is, at the destination SmartPOP 46a) that is not available to the LPs at the source SmartPOP 44a. The LP Allocator tries to commit the resources of the digital network to establish the fax transmission, as well as responding to call termination.

The LP Bandwidth Vector (BV) monitors the current state of transmission resources in the SmartPOP by recording consumed SmartPOP bandwidth for each LP in the SmartPOP. The BV encapsulates the data structure and algorithm by which the availability of transmission bandwidth for fax sessions is determined.

The following discussion concerns the communications protocol that takes place between the FaxJack and the source SmartPOP.

Communications between a FaxJack and a SmartPOP are done utilizing a master/slave relationship. In most circumstances, the SmartPOP is the master and issues commands to the FaxJack. The FaxJack executes those commands. The FaxJack has the capability to reject commands from the SmartPOP if they can not be carried out and notifies the SmartPOP in those circumstances. The purpose behind the master/slave relationship is to put as much of the intelligence in the SmartPOP where it can easily be changed and updated.

In the preferred embodiment, communications between the FaxJack and the SmartPOP are achieved through the use of a modem running at either 300, 1200, or 2400 baud. Of course, the baud rate can be selected to be any of a plurality of allowable baud rates for modems. In the preferred embodiment, all digital values are transmitted in hexadecimal, but this need not necessarily be the case.

In the figures described herein, all bytes are shown with the most significant bit, MSB, on the left and the least significant bit, LSB, on the right. Table 1 gives an illustration of the bit definitions.

TABLE 1

Bit Sequence

| 7 | 6 | 5 | 4 | 3 | 2 | 1 | 0 |
|---|---|---|---|---|---|---|---|
| MSB | | | | | | | LSB |

Further, all strings of bytes are shown from top to bottom. Referring now to Table 2, byte 1 is transmitted first, the byte 2 second, and so forth. Bytes received are also be shown in the same manner.

TABLE 2

Byte Sequence

| Byte 1 |
|---|
| Byte 2 |
| Byte 3 |
| ⋮ |
| Byte n |

The first byte of each message is called a header byte and designates the sender of the message, hereafter referred to as the source. The header byte also designates who is to receive the message, hereafter referred to as the destination. Table 3 shows the format of the header byte.

TABLE 3

Header Byte

| Source ID | | Destination ID | |
|---|---|---|---|
| D7 | D4 | D3 | D1 |

If a SmartPOP is transmitting a message to a FaxJack, then the SmartPOP is the source and the FaxJack is the destination. If the FaxJack is transmitting a message to the SmartPOP, then the FaxJack is the source and the SmartPOP is the destination. Table 4 gives the designations of the source and destination IDs.

As can be seen in Table 4, the ID of the hardware FaxJack is designated as "1" and the ID of the SmartPOP is designated as "O". Thus, the header byte for a FaxJack to send a message to a SmartPOP is "10", and the header byte for a SmartPOP to send a message to a FaxJack is "01".

TABLE 4

Source and Destination IDs

| Description | ID |
|---|---|
| SmartPOP | 0 |
| Hardware FaxJack | 1 |
| Software FaxJack | 2 |
| Reserved | 3–f |

Each message has a message length byte, which is the second byte of the corresponding message. The message length includes all bytes in the message, including the header, message length byte, command ID byte, data bytes, and checksum bytes. In the preferred embodiment, the maximum length message is 255 bytes.

Telephone numbers communicated to the SmartPOP contain the country code designation along with the area code, exchange and remaining digits. This requires a total of 2 bytes for the country code and 5 bytes for the destination phone number.

The country code can be anywhere from 1 to 3 digits. The upper nibble of the first byte of the country code is used to designate the length of the country code. If the country code is only one digit, then the second byte of the country code is not used and is not transmitted.

The destination phone number can be up to 10 digits in length, which requires 5 bytes. The bytes are transmitted in sequential order, with the upper nibble of the first byte being the first digit, the lower nibble of the first byte the second digit, the upper nibble of the second byte the third digit, and so forth. In the preferred embodiment, all 5 bytes are always transmitted.

Throughout this description, all values that are actual values are shown as being enclosed in parenthesis. As an example, (01) designates the value "01" with 0 being the high order nibble and 1 being the low order nibble.

The format of all messages transmitted between a FaxJack and a SmartPOP is described in detail hereinbelow. The first byte is the header byte, followed by the message length byte, followed by the command ID byte, followed by a variable number of data bytes (dependent on the command), followed by a 2 byte checksum. Table 5 shows the message format used in the preferred embodiment.

TABLE 5

Message Format

| Header |
|---|
| Message Length |
| Command ID |
| Data - Byte 1 (optional) |
| Data - Byte 2 (Optional) |
| ⋮ |
| Data - Byte n (Optional) |
| Checksum - Byte 1 |
| Checksum - Byte 2 |

When a sending fax device desires to make a fax transmission, the FaxJack connected with the sending fax device detects this condition. The FaxJack calls a SmartPOP (within its local exchange) to initiate a call setup, and upon receiving an indication that the SmartPOP answered, the FaxJack sends an initial message to start communications. All initial messages communicated from the FaxJack contain information required by the SmartPOP to determine the serial number of the FaxJack, an encrypted key that is decoded for authorization, the checksum of the current network directory being utilized by the FaxJack and the current FaxJack software version number. This information is in addition to the normal message overhead of header, message length and checksum bytes. The initial message also contains a command with additional data bytes that indicates to the SmartPOP the action being requested by the FaxJack. Typical actions are a request to send a fax, request for directory download or request for FaxJack software update. Each of initial messages that can be sent from a FaxJack are described in more detail hereinbelow.

If the SmartPOP successfully receives the initial message from the FaxJack, it then communicates a message which includes a header byte followed by a command and optional data bytes, followed by 2 bytes of checksum. The number of data bytes is dependent on the command. The SmartPOP-to-FaxJack commands and the FaxJack-to-SmartPOP commands are described in more detail hereinbelow.

If the SmartPOP does not successfully receive the initial FaxJack message or any other message, it can request a retransmit by issuing a retransmit command. If the FaxJack does not successfully receive a message, it can also issue a retransmit command. Upon receipt of a retransmit command, the receiver retransmits the previously transmitted message.

Commands are instructions sent to either the FaxJack or the SmartPOP that request a particular action be performed. All commands include a command byte followed by a variable number of data bytes. Some commands do not have any data bytes. Table 6 shows the currently defined commands used in the preferred embodiment of the invention. Each command is described in more detail later in this section. This listing of commands is meant as a way of example, and not as a way of limitation, on the various commands that could be utilized, as known to one of ordinary skill in the art.

TABLE 6

Commands

| Commands | Command ID | Description |
|---|---|---|
| Setup Fax Request | 01h | FaxJack message sent to SmartPOP to request a fax transmission. |
| Retransmit | 02h | Retransmit last message. |
| Current Time | 03h | Indicates current time. |
| Clear Statistical Data | 04h | Instructs FaxJack to clear all or part of statistical data |
| Upload Statistical Data | 05h | Instructs FaxJack to upload all or part of statistical data. |
| Connect Fax Device to SmartPOP | 06h | Instructs FaxJack to connect the attached fax device to the SmartPOP for communications. |
| Upload Setup Data | 07h | Instructs FaxJack to upload its current setup data. |
| Program Setup Data | 08h | Instructs FaxJack to programs setup data to the included data bytes. |
| Message Received OK | 09h | Indicates to destination that last message was received correctly. |
| Use Alternate Service | 0Ah | Instructs FaxJack to attempt to deliver fax through alternate number. |
| Use Customers Long Distance Carrier | 0Bh | Instructs FaxJack to attempt to deliver fax through customers long distance carrier. |
| Lockout | 0Ch | Instructs FaxJack to lockout FaxJack from using network. |
| Program Domestic SmartPOP Number | 0Dh | Instructs FaxJack to program the SmartPOP number for domestic long distance calls to the number that follows. |
| Program International SmartPOP Number | 0Eh | Instructs FaxJack to program the SmartPOP number for international calls to the number that follows. |
| Program Alternate Service Number | 0Fh | Instructs FaxJack to program to alternate service number that follows. |
| Program Network Directory | 10h | Instructs FaxJack to program the network directory with the bytes that follow. |
| Program International Country Codes | 11h | Instructs FaxJack to program the international country codes with the bytes that follow. |
| Program Special Area Codes | 12h | Instructs the FaxJack to program the special area codes table with the bytes that follow. |
| Program Special Exchanges | 13h | Instructs the FaxJack to program the special exchanges table with the bytes that follow. |
| Program Domestic SmartPOP Timeout | 14h | Instructs FaxJack to program SmartPOP timeout for domestic long distance fax requests with data byte that follows. |
| Program International SmartPOP Timeout | 15h | Instructs the FaxJack to program SmartPOP timeout for international fax requests with the data byte that follows. |
| Program Alternate Service Timeout | 16h | Instructs FaxJack to program alternate service timeout with data byte that follows. |
| Program Selective SmartPOP Usage Timeout | 17h | Instructs FaxJack to program selective SmartPOP usage timeout with data byte that follows. |
| Enable Selective SmartPOP Usage | 18h | Instructs FaxJack to enter selective SmartPOP usage mode. |
| Program Statistical Base Time | 19h | Instructs FaxJack to program statistical base time with data byte that follows. |
| Program End of Dialing Number Delay | 1Ah | Instructs FaxJack to program the end of dialing number delay to the data byte that follows. |
| Program Encryption Key Algorithm | 1Bh | Instructs FaxJack to program the encryption key algorithm with the data bytes that follow. |
| Call Back Later | 1Ch | Instructs FaxJack to call back SmartPOP at a later time. The attached data byte indicates the reason for call back. |
| Area Code and Exchange Not Serviced | 1Dh | Instructs FaxJack that the requested area code and exchange are not serviced by the network. |
| Disconnect | 1Eh | Instructs the FaxJack to disconnect from the SmartPOP. |
| Select Different Connection Method | 1Fh | Instructs the FaxJack to select another connection method. FaxJack can either select the alternate number to the customers long distance carrier. |
| Communications Error | 20h | Indicates that there was a communications error. The attached byte indicates the cause of the error if available. |
| Setup Network Directory Download | 21h | FaxJack to SmartPOP message indicating a request to download a new version of the directory. |
| Setup FaxJack Software Download | 22h | FaxJack to SmartPOP message indicating a request to download a new version of the FaxJack software. |
| Setup International Country Code Download | 23h | FaxJack to SmartPOP message indicating a request to download a new version of the international country codes that are serviced by the network. |
| Setup FaxJack Download of Setup Parameters | 24h | FaxJack to SmartPOP message indicating a request to download FaxJack setup parameters. |
| Setup Statistical Data Upload | 25h | FaxJack to SmartPOP message indicating a request to upload statistical data. |
| Statistical Data Upload | 26h | This command is sent to the SmartPOP along with the statistical data to be uploaded. |

TABLE 6-continued

Commands

| Commands | Command ID | Description |
|---|---|---|
| Setup Data Upload | 27h | This command is sent to the SmartPOP along with the setup data to be uploaded. |
| Statistical Data Invalid | 28h | FaxJack to SmartPOP message indicating that the statistical data contained within the FaxJack is not valid. This message would be in response to an Upload Statistical Data, command ID 05, from the SmartPOP. |
| Start Statistical Data Gathering | 29h | This command is sent from the SmartPOP to the FaxJack to tell it to start gathering statistical data. |
| Cancel Statistical Data Gathering | 2Ah | This command is sent from the SmartPOP to the FaxJack indicating it should discontinue gathering statistical data. |

The Setup Fax Request command is sent from a FaxJack to a SmartPOP as an initial communications to request a fax transmission through the digital network.

The setup fax request message includes 2 synchronization bytes, a length byte, 4 byte serial number, 4 byte encrypted key, one byte indicating the time it took to connect to the SmartPOP, 5 byte destination phone number, 4 byte network directory version number, 2 byte FaxJack software version number, and a 2 byte checksum. Table 7 gives the message details of the setup fax request message used in the preferred embodiment of the invention.

TABLE 7

Setup Fax Request Command

| Header |
|---|
| Message Length - (1Bh) |
| Setup Fax Request Command |
| Serial Number - Byte 1 |
| Serial Number - Byte 2 |
| Serial Number - Byte 3 |
| Serial Number - Byte 4 |
| Encrypted Key - Byte 1 |
| Encrypted Key - Byte 2 |
| Encrypted Key - Byte 3 |
| Encrypted Key - Byte 4 |
| Time to Connect |
| Country Code - Length & Digit 1 |
| Country Code - Digits 2 & 3 |
| Destination Phone Number - Digits 1 & 2 |
| Destination Phone Number - Digits 2 & 4 |
| Destination Phone Number - Digits 5 & 6 |
| Destination Phone Number - Digits 7 & 8 |
| Destination Phone Number - Digits 9 & 10 |
| Network Direstory Version - Byte 1 |
| Network Direstory Version - Byte 2 |
| Network Direstory Version - Byte 3 |
| Network Direstory Version - Byte 4 |
| FaxJack Software Version Number - Byte 1 |
| FaxJack Software Version Number - Byte 2 |
| Checksum - Byte 1 |
| Checksum - Byte 2 |

The Retransmit command signals the destination to retransmit the previously sent message. If no message has been previously sent, the receiver sends back an error message with a communications error code of "No message to retransmit."

A retransmit command consists of 2 synchronization bytes, the retransmit command byte, and 2 checksum bytes. Table 8 gives the structure of the retransmit command used in the preferred embodiment of the invention.

TABLE 8

Retransmit Command

| Header |
|---|
| Message Length - (05h) |
| Retransmit Command - (02h) |
| Checksum - Byte 1 |
| Checksum - Byte 2 |

The Current Time command is sent by the SmartPOP to the FaxJack to instruct the FaxJack to set its current time to the enclosed time. In the preferred embodiment, the Current Time command is needed to convert relative statistical data to absolute time. The Current Time command could also be used when the SmartPOP requests that the FaxJack call back at a later time. The structure of the Current Time command used in the preferred embodiment of the invention is given in Table 9.

TABLE 9

Current Time Command

| Header |
|---|
| Message Length - (08h) |
| Current Time Command - (03h) |
| Time-Byte 1 - (Hours) |
| Time-Byte 2 - (Minutes) |
| Time-Byte 3 - (Seconds) |
| Checksum - Byte 1 |
| Checksum - Byte 2 |

As can be seen from Table 9, the upper nibble of the time bytes contains the first digit and the lower nibble contains the second digit. As an example, if the time were 13:02:34, the time bytes would be 13, 02, 34.

The Clear Statistical Data command is sent from the SmartPOP to the FaxJack to indicate that the FaxJack should clear statistical data that it has accumulated. This command is typically issued during initial FaxJack setup or after the SmartPOP has uploaded statistical data from the FaxJack. This command can also be used to instruct the FaxJack to clear part or all of the statistical data it has accumulated. Table 10 shows the detailed structure of the Clear Statistical Data command used in the preferred embodiment of the invention.

TABLE 10

Clear Statistical Data Command

| Header |
| --- |
| Message Length - (06h) |
| Clear Statistical Data Command - (04h) |
| Block Number |
| Checksum - Byte 1 |
| Checksum - Byte 2 |

As can be seen from Table 10, the block number designates the block of statistical data that should be cleared. The block numbers are defined in Table 11.

TABLE 11

Statistical Data Block Numbers

| Block Number (hex) | Description |
| --- | --- |
| 0 | All Data |
| 1 | All Non-Distribution Table Data |
| 2 | Outgoing Call Distribution Table Data |
| 3 | Incoming Call Distribution Table Data |
| 4–FF | Reserved |

The Upload Statistical Data command is sent from the SmartPOP to the FaxJack to tell the FaxJack to upload statistical data to the SmartPOP. This command can also be used to instruct the FaxJack to upload part or all of the statistical data it has accumulated. Table 12 gives the message details of the Upload Statistical Data command used in the preferred embodiment of the invention.

TABLE 12

Upload Statistical Data Command

| Header |
| --- |
| Message Length - (06h) |
| Upload Statistical Data Command - (05h) |
| Block Number |
| Checksum - Byte 1 |
| Checksum - Byte 2 |

As can be seen from Table 12, the block number designates the block of statistical data that should be uploaded. As stated earlier, the block numbers are defined in Table 11.

The Connect Fax Device to SmartPOP command is sent from the SmartPOP to the FaxJack to instruct the FaxJack to connect the attached fax device directly to the SmartPOP. Table 13 gives the message details of the Connect Fax Device to SmartPOP command as used in the preferred embodiment of the invention.

TABLE 13

Connect Fax Device to SmartPOP Command

| Header |
| --- |
| Message Length - (05h) |
| Connect Fax Device to SmartPOP Command - (06h) |
| Checksum - Byte 1 |
| Checksum - Byte 2 |

The Upload Setup Data command is sent from the SmartPOP to the FaxJack, and it is used to instruct the FaxJack to upload setup data to the SmartPOP. This command can also be used to instruct the FaxJack to upload all or part of its setup data. Table 14 shows the message details of the Upload Setup Data command used in the preferred embodiment of the invention.

TABLE 14

Upload Setup Data Command

| Header |
| --- |
| Message Length - (05h) |
| Connect Fax Device to SmartPOP Command - (07h) |
| Checksum - Byte 1 |
| Checksum - Byte 2 |

The Program Setup Data command is used to program setup data stored in a Faxjack. This command has the capability to program all or part of the setup data contained within the FaxJack. Any previous setup data values contained within the FaxJack is overwritten with the new setup values. Table 15 gives the message details of the Program Setup Data command used in the preferred embodiment of the invention.

TABLE 15

Program Setup Data Command

| |
|---|
| Header |
| Message Length |
| Program Setup Data Command - (08h) |
| Setup Data - Byte 1 |
| Setup Data - Byte 2 |
| ⋮ |
| Setup Data - Byte n |
| Checksum - Byte 1 |
| Checksum - Byte 2 |

The Message Received OK command indicates that the previously transmitted message was received correctly. Table 16 gives the message details of the Message Received OK command used in the preferred embodiment of the invention.

TABLE 16

Message Received OK Command

| |
|---|
| Header |
| Message Length - (05h) |
| Message Recieved OK Command - (09h) - (06h) |
| Checksum - Byte 1 |
| Checksum - Byte 2 |

The Use Alternate Service command is issued from a SmartPOP to a FaxJack to instruct the FaxJack to hang up and try to route the call through an alternate service number. If there is no alternate service number, the FaxJack routes the call through the customers long distance carrier. Table 17 gives the message details of the Use Alternate Service command used in the preferred embodiment of the invention.

TABLE 17

Use Alternate Service Command

| |
|---|
| Header |
| Message Length - (05h) |
| Use Alternate Service Command - (0Ah) |
| Checksum - Byte 1 |
| Checksum - Byte 2 |

The Use Customers Long Distance Carrier command is issued from a SmartPOP to a FaxJack to instruct the FaxJack to hang up and route the call through the customers' long distance carrier. Even if the FaxJack has an alternate service number, it does not attempt to deliver the call through the alternate service. Table 18 gives the message details of the Use Customers Long Distance Carrier command used in the preferred embodiment of the invention.

TABLE 18

Use Customer Long Distance Carrier Command

| |
|---|
| Header |
| Message Length - (05h) |
| Use Customers Long Distance Carrier Command - (0Bh) |
| Checksum - Byte 1 |
| Checksum - Byte 2 |

The Lockout command is issued from a SmartPOP to a FaxJack to indicate that the FaxJack is locked out from calling the SmartPOP and the alternate service. This command is provided for situations such as a customer did not pay their bill or the service is discontinued by a user. Table 19 gives the message details of the Lockout command used in the preferred embodiment of the invention.

TABLE 19

Lockout Command

| |
|---|
| Header |
| Message Length - (05h) |
| Lockout Command - (0Ch) |
| Checksum - Byte 1 |
| Checksum - Byte 2 |

The Program Domestic SmartPOP Number command is sent from the SmartPOP to a FaxJack to indicate that the FaxJack should program its SmartPOP phone number for domestic long distance calls based on the enclosed data bytes in the command. Table 20 gives the message details of the Program Domestic SmartPOP Number command used in the preferred embodiment of the invention.

TABLE 20

Program Domestic SmartPOP Number Command

| Header |
| --- |
| Message Length - (0Ah) |
| Program Domestic SmartPOP Number Command - (0Dh) |
| Domestic SmartPOP Phone Number - Digits 1 & 2 - (Area Code 1 & Area Code 2) |
| Domestic SmartPOP Phone Number - Digits 2 & 4 - (Area Code 3 & Exchange 1) |
| Domestic SmartPOP Phone Number - Digits 5 & 6 - (Exchange 2 & Exchange 3) |
| Domestic SmartPOP Phone Number - Digits 7 & 8 - (Station 1 & Station 2) |
| Domestic SmartPOP Phone Number - Digits 9 & 10 - (Station 3 & Station 4) |
| Checksum - Byte 1 |
| Checksum - Byte 2 |

The Program International SmartPOP Number command is sent from the SmartPOP to a FaxJack to indicate that the FaxJack should program its SmartPOP number for international calls based on the enclosed data bytes in the command. Table 21 gives the message details of the Program International SmartPOP Number command used in the preferred embodiment.

TABLE 21

Program International SmartPOP Number Command

| Header |
| --- |
| Message Length - (0Ah) |
| Program International SmartPOP Number Command - (0Eh) |
| International SmartPOP Phone Number - Digits 1 & 2 - (Area Code 1 & Area Code 2) |
| International SmartPOP Phone Number - Digits 2 & 4 - (Area Code 3 & Exchage 1) |
| International SmartPOP Phone Number - Digits 5 & 6 - (Exchange 2 & Exchange |
| International SmartPOP Phone Number - Digits 7 & 8 - (Station 1 & Station 2) |
| International SmartPOP Phone Number - Digits 9 & 10 - (Station 3 & Station 4) |
| Checksum - Byte 1 |
| Checksum - Byte 2 |

The Program Alternate Service Number command is sent from the SmartPOP to a FaxJack to indicate that the FaxJack should program its alternate service number using the enclosed data bytes in the command. Table 22 gives the message details of the Program Alternate Service Number command used in the preferred embodiment.

TABLE 22

Program Alternate Service Number Command

| Header |
| --- |
| Message Length - (0Ah) |
| Program Alternate Service Number Command - (0Fh) |
| Alternate Service Phone Number - Digits 1 & 2 - (Area Code 1 & Area Code 2) |
| Alternate Service Phone Number - Digits 2 & 4 - (Area Code 3 & Exchage 1) |
| Alternate Service Phone Number - Digits 5 & 6 - (Exchange 2 & Exchange 3) |
| Alternate Service Phone Number - Digits 7 & 8 - (Station 1 & Station 2) |
| Alternate Service Phone Number - Digits 9 & 10 - (Station 3 & Station 4) |
| Checksum - Byte 1 |
| Checksum - Byte 2 |

The Program Network Directory command is sent from a SmartPOP to a FaxJack to indicate that the following bytes contained in the command are to be used for a directory update. The command contains the data compression type, area code to be updated and data bytes corresponding to that area code. In the preferred embodiment, the area code bytes are not compressed. Table 23 gives the message details of the Program Network Directory command used in the preferred embodiment of the invention.

TABLE 23

Program Network Directory Command

| Header |
| --- |
| Message Length |
| Program Network Directory Command - (10h) |
| Compression/Area Code - Byte 1 - (Compression Type & Area Code 1) |
| Area Code - Byte 2 - (Area Code 2 & Area Code 3) |
| Directory Data - Byte 1 |
| Directory Data - Byte 2 |
| ⋮ |
| Directory Data - Byte n |
| Checksum - Byte 1 |
| Checksum - Byte 2 |

The length of the Program Network Directory message is variable and depends on the compression algorithm used. The upper nibble of the Compression/Area Code byte indicates the particular compression algorithm that is used. Table 24 defines the various data compression types that may be utilized.

TABLE 24

Compression Types

| Description | Bit Pattern |
| --- | --- |
| Uncompressed | 0 0 0 0 |
| Reserved | 0 0 0 1 - 1 1 1 1 |

The Program International Country Codes command is sent from a SmartPOP to a FaxJack to indicate that the following bytes in the command are an update to the international Country Codes table stored at the FaxJack. Table 25 gives the message details of the Program International Country Codes command used in the preferred embodiment of the invention.

TABLE 25

Program International Country Codes Command

| Header |
| --- |
| Message Length |
| Program International Country Codes Command - (11h) |
| Compression Type - (Compression ID) |
| Length |
| Country Code Data - Byte 1 |
| Country Code Data - Byte 2 |
| ⋮ |
| Country Code Data - Byte n |
| Checksum - Byte 1 |
| Checksum - Byte 2 |

The length of the Program International Country Code message is variable and depends on the compression algorithm used. In the preferred embodiment, the lower nibble of the Compression Type byte indicates which compression algorithm is used, and the upper nibble of the Compression Type byte is not used. As discussed earlier, Table 24 defines the data compression types that can be utilized.

The Program Special Area Codes command is sent from a SmartPOP to a FaxJack to instruct the FaxJack to program its special area code table to the data bytes that are contained in the command. The special area code table is a list of area codes the FaxJack dials without checking if the area code or exchange are in the network directory. Table 26 gives the message details of the Program Special Area Codes command used in the preferred embodiment.

TABLE 26

Program Special Area Codes Command

| Header |
| --- |
| Message Length |
| Program Special Exchange Codes Command - (12h) |
| Compression Type - (Compression ID) |
| Length |
| Special Area Code Data - Byte 1 |
| Special Area Code Data - Byte 2 |
| ⋮ |
| Special Area Code Data - Byte n |
| Checksum - Byte 1 |
| Checksum - Byte 2 |

The length of the Program Special Area Code command is variable and depends on the compression algorithm used. In the preferred embodiment, the lower nibble of the Compression Type byte indicates which compression algorithm is used, and the upper nibble of the Compression Type byte is not used. Table 24 (discussed earlier) defines the data compression types that can be utilized.

The Program Special Exchanges command sent by a SmartPOP to a FaxJack to instruct the FaxJack to program its special exchange table using certain data bytes in the command. The special exchange table is a list of exchanges that are dialed without checking to see if the area code and exchange are in the network directory table. Table 27 gives the message details of the Program Special Exchanges command used in the preferred embodiment of the invention.

TABLE 27

Program Special Exchanges Command

| Header |
| --- |
| Message Length |
| Program Special Area Codes Command - (13h) |
| Compression Type - (Compression ID) |
| Length |
| Special Exchanges Data - Byte 1 |
| Special Area Code Data - Byte 2 |
| ⋮ |
| Special Exchanges Data - Byte n |
| Checksum - Byte 1 |
| Checksum - Byte 2 |

The length of the Program Special Exchanges message is variable and depends on the compression algorithm used. In the preferred embodiment, the lower nibble of the Compression Type byte indicates which compression algorithm is used, and the upper nibble of the Compression Type byte is not used. Table 24 defines the data compression types that can be utilized.

The Program Domestic SmartPOP Timeout command sent by a SmartPOP to a FaxJack to instruct the FaxJack to program its SmartPOP timeout value for domestic long distance calls to the data value that is included in the command. The SmartPOP timeout value is the amount of time the FaxJack waits for the SmartPOP to answer when it dials the SmartPOP for a domestic long distance fax request, and in the preferred embodiment it is designated in tenths of seconds. Table 28 gives the message details of the Program Domestic SamrtPOP Timeout command used in the preferred embodiment.

TABLE 28

Program Domestic SmartPOP Timeout Command

| Header |
| --- |
| Message Length - (06h) |
| Program Domestic SmartPOP Timeout Command - (14h) |
| Domestic SmartPOP Timeout Time |
| Checksum - Byte 1 |
| Checksum - Byte 2 |

The Program International SmartPOP Timeout command is sent from a SmartPOP to a FaxJack and is used to inform the FaxJack to program its SmartPOP timeout value when making international calls to the data byte that are included in the command. The SmartPOP timeout value is the amount of time that the FaxJack waits for the SmartPOP to answer when it dials the SmartPOP, and in the preferred embodiment it is designated in tenths of seconds. Table 29 gives the message details of the Program International SmartPOP Timeout command used in the preferred embodiment.

TABLE 29

Program International SmartPOP Timeout Command

| Header |
| --- |
| Message Length - (06h) |
| Program International SmartPOP Timeout Command - (15h) |
| International SmartPOP Timeout Time |
| Checksum - Byte 1 |
| Checksum - Byte 2 |

The Program Alternate Service Timeout command is sent from a SmartPOP to a FaxJack and is used to instruct the FaxJack to program its alternate number timeout value to the data value that is included in the command. The alternate number timeout value is the amount of time that the FaxJack waits for the alternate number to answer, and in the preferred embodiment it is designated in tenths of seconds. Table 30 gives the message details of the Program Alternate Service Timeout command used in the preferred embodiment.

TABLE 30

Program Alternate Service Timeout Command

| Header |
| --- |
| Message Length - (06h) |
| Program Alternate Service Timeout Command - (16h) |
| Alternate Service Timeout Time |
| Checksum - Byte 1 |
| Checksum - Byte 2 |

The Program Selective SmartPOP Usage Timeout command is sent from a SmartPOP to a FaxJack and is used to instruct the FaxJack to program its selective SmartPOP usage timeout time. The selective SmartPOP usage timeout time is the amount of time selective SmartPOP usage is in effect from receipt of the Enable Selective SmartPOP Usage command, and in the preferred embodiment it is designated in minutes. Table 31 gives the message details of the Program Selective SmartPOP Usage Timeout command used in the preferred embodiment.

TABLE 31

Program Selective SmartPOP Usage Timeout Command

| Header |
| --- |
| Message Length - (06h) |
| Program Selective SmartPOP Usage Timeout Command - (17h) |
| Selective SmartPOP Usage Timeout Time |
| Checksum - Byte 1 |
| Checksum - Byte 2 |

The Enable Selective SmartPOP Usage command is sent from a SmartPOP to a FaxJack and it is used to instruct the FaxJack to enter a selective SmartPOP usage mode. In this mode, the FaxJack only dials the SmartPOP, with calls that could go through the SmartPOP, every N times. For example, if N is set to 3, every 3rd call that could go through the SmartPOP actually results in the FaxJack dialing the SmartPOP. Table 32 gives the message details of the Enable Selective SmartPOP Usage command used in the preferred embodiment.

TABLE 32

Enable Selective SmartPOP Usage Command

| Header |
| --- |
| Message Length - (06h) |
| Enable Selective SmartPOP Usage Command - (18h) |
| N |
| Checksum - Byte 1 |
| Checksum - Byte 2 |

The Program Statistical Base Time command is sent from a SmartPOP to a FaxJack and it is used to instruct the FaxJack to program its statistical time base to the data byte that is included in the command. In the preferred embodiment, the SmartPOP first issues a clear statistical data command that clears all statistical data before issuing this command. This ensures that all data collected is of the same time base. Table 33 gives the message details of the Program Statistical Base Time command used in the preferred embodiment.

TABLE 33

Program Statistical Base Time Command

| Header |
| --- |
| Message Length - (06h) |
| Program Statistical Base Time Command - (19h) |
| Statistical Base Time |
| Checksum - Byte 1 |
| Checksum - Byte 2 |

The Program End of Dialing Number Delay command is sent from a SmartPOP to a FaxJack and it is used to instruct the FaxJack to program the delay before determining that the attached fax device has finished dialing. In the preferred embodiment, this time is designated in milliseconds. Table 34 gives the message details of the Program End of Dialing Number Delay command used in the preferred embodiment.

TABLE 34

Program End of Dialing Number Delay Command

| Header |
| --- |
| Message Length - (06h) |
| Program End of Dialing Number Delay Command - (1Ah) |
| End of Dialing Number Delay |
| Checksum - Byte 1 |
| Checksum - Byte 2 |

The Program Encryption Key Algorithm command is sent from a SmartPOP to a FaxJack and it is used to instruct the FaxJack to reprogram the algorithm which it uses to encrypt and unencrypt keys. The enclosed data bytes in the command are the code to be used to encrypt and unencrypt data keys. Table 35 gives the message details of the Program Encryption Key Algorithm command used in the preferred embodiment.

TABLE 35

Program Encryption Key Algorithm Command

| Header |
| --- |
| Message Length |
| Program Encryption Key Algorithm Command - (1Bh) |
| Length - Byte 1 |
| Length - Byte 2 |
| Encryption Key Algorithm Data - Byte 1 |
| Encryption Key Algorithm Data - Byte 2 |
| ⋮ |
| Encryption Key Algorithm Data - Byte n |
| Checksum - Byte 1 |
| Checksum - Byte 2 |

The length of the Program Encryption Key Algorithm message is variable and depends on the algorithm used.

The Call Back Later command is sent from a SmartPOP to a FaxJack and it is used to instruct the FaxJack to call the SmartPOP back at a later time. The data bytes included in the command indicate the reason for call back and the amount of time to wait before calling back. In the preferred embodiment, the time value is designated in hours and minutes. Table 36 gives the message details of the Call Back Later command used in the preferred embodiment.

TABLE 36

Call Back Later Command

| Header |
| --- |
| Message Length - (08h) |
| Call Back Later Command - (1Ch) |
| Call Back ID |
| Call Back Time - Byte 1 - (Hours) |
| Call Back Time - Byte 2 - (Minutes) |
| Checksum - Byte 1 |
| Checksum - Byte 2 |

Byte 1 of the call back delay time is the number of hours and byte 2 is the number of minutes before calling back. The call back ID is shown in Table 37.

TABLE 37

Call Back ID Designations

| Call Back ID | Description |
| --- | --- |
| 00 | Program Network Directory |
| 01 | Upload Statistical Data |
| 02 | Upload Setup Data |
| 03 | Program Setup Data |
| 04 | Program Domestic SmartPOP Number |
| 05 | Program International SmartPOP Number |
| 06 | Program Alternate Service Number |
| 07 | Program International Country Codes |
| 08 | Program Special Area Codes |
| 09 | Program Special Exchanges |
| 0A | Program Domestic SmartPOP Timeout |
| 0B | Program International SmartPOP Timeout |
| 0C | Program Alternate Service Timeout |
| 0D | Program Selective SmartPOP Usage Timeout |
| 0E | Program Statistical Base Time |
| 0F | Program End of Dialing Number Delay |
| 10 | Program Encryption Key Algorithm |
| 11–FE | Reserved |
| FF | Notified at time of call back |

The bytes "FF" are sent if the SmartPOP is to notify the FaxJack of the reason for call back at the time of call back.

The Area Code and Exchange Not Serviced command is sent from a SmartPOP to a FaxJack and it is issued to the FaxJack when the SmartPOP determines that the requested area code and exchange are not serviced by the network. This could happen in the case of a FaxJack not having the most current network directory. Table 38 gives the message details of the Area Code and Exchange Not Serviced command used in the preferred embodiment.

TABLE 38

Area Code and Exchange Not Serviced Command

| Header |
| --- |
| Message Length - (05h) |
| Area Code and Exchange Not Serviced Command - (1Dh) |
| Checksum - Byte 1 |
| Checksum - Byte 2 |

Upon reception of this command, the FaxJack modifies its local copy of the network directory table to indicate that the area code and exchange that it requested are not serviced by the network. This prevents the FaxJack from requesting the same area code and exchange in the event it does not get an updated directory before the next request.

The Disconnect command is sent from a SmartPOP to a FaxJack and it is used to indicate that communications with the SmartPOP are completed and that the FaxJack should disconnect from the SmartPOP. Table 39 gives the message details of the Disconnect command used in the preferred embodiment.

TABLE 39

Disconnect Command

| Header |
| --- |
| Message Length - (05h) |
| Disconnect Command - (1Eh) |
| Checksum - Byte 1 |
| Checksum - Byte 2 |

The Select Different Connection Method command is sent from a SmartPOP to a FaxJack and it instructs the FaxJack to select a different connection method to deliver the source fax transmission. With this method, the FaxJack makes the decision of whether to use the alternate service number or the customers' long distance carrier. Table 40 gives the message details of the Select Different Connection Method command used in the preferred embodiment.

TABLE 40

Select Different Connection Method Command

| Header |
| --- |
| Message Length - (05h) |
| Select Different Connection Method Command - (1Fh) |
| Checksum - Byte 1 |
| Checksum - Byte 2 |

The Communications Error command is sent when the receiver determines that there was a communications error. The byte that follows indicates the type of communications error. Table 41 gives the message details of the Communications Error command used in the preferred embodiment.

TABLE 41

Communications Error Command

| Header |
| --- |
| Message Length - (06h) |
| Communications Error Command - (20h) |
| Communications Error ID |
| Checksum - Byte 1 |
| Checksum - Byte 2 |

TABLE 42

Communication Error Codes

| Communication Error | Communication Error ID (hex) | Description |
| --- | --- | --- |
| Unknown | 00h | Unknown communications error. |
| Bad Message Checksum | 01h | Calculated checksum did not match checksum in message. |
| Unknown Command | 02h | Unknown command in the received message |
| No Message to Retransmit | 03h | Reserved for later usage. |
| Reserved | 04h–FFh | Reserved for later usage |

The Setup Network Directory Download command is sent from a FaxJack to a SmartPOP to request a download of a new version of the network directory. This command is generally a result of the SmartPOP issuing a call back command to the FaxJack at an earlier time in which the SmartPOP instructs the FaxJack to request a network directory download at a later time. This command can also be issued by the user from local control mode or initiated by the FaxJack in the event it determines that it has become orphaned. Table 43 gives the message details of the Setup Network Directory Download command used in the preferred embodiment.

TABLE 43

Setup Network Directory Download Command

| Header |
| --- |
| Message Length - (13h) |
| Setup Network Directory Download Command - (21h) |
| Serial Number - Byte 1 |
| Serial Number - Byte 2 |
| Serial Number - Byte 3 |
| Serial Number - Byte 4 |
| Encrypted Key - Byte 1 |
| Encrypted Key - Byte 2 |
| Encrypted Key - Byte 3 |
| Encrypted Key - Byte 4 |
| Network Directory Version - Byte 1 |
| Network Directory Version - Byte 2 |
| Network Directory Version - Byte 3 |
| Network Directory Version - Byte 4 |
| FaxJack Software Version Number - Byte 1 |
| FaxJack Software Version Number - Byte 2 |
| Checksum - Byte 1 |
| Checksum - Byte 2 |

The Setup FaxJack Software Download command is sent from a FaxJack to a SmartPOP to request a download of a new version of the FaxJack software. This command is generally a result of the SmartPOP issuing a call back command to the FaxJack at an earlier time in which the SmartPOP instructs the FaxJack to request a software download of a new version of the FaxJack software. This command can also be issued by the user from local control mode or initiated by the FaxJack in the event it determines it has a corrupt version of FaxJack software. Table 44 gives the message details of the Setup FaxJack Software Download command used in the preferred embodiment.

TABLE 44

Setup FaxJack Software Download Command

| Header |
| --- |
| Message Length - (OFh) |
| Setup Network Directory Download Command - (22h) |
| Serial Number - Byte 1 |
| Serial Number - Byte 2 |
| Serial Number - Byte 3 |
| Serial Number - Byte 4 |
| Encrypted Key - Byte 1 |
| Encrypted Key - Byte 2 |
| Encrypted Key - Byte 3 |
| Encrypted Key - Byte 4 |
| FaxJack Software Version Number - Byte 1 |
| FaxJack Software Version Number - Byte 2 |
| Checksum - Byte 1 |
| Checksum - Byte 2 |

The Setup International Country Code Download command is sent from a FaxJack to a SmartPOP to request a download of a new version of the international country codes that are services by the network. This command is generally a result of the SmartPOP issuing a call back command to the FaxJack at an earlier time in which the SmartPOP instructs the FaxJack to request a international code download at a later time. This command can also be issued by the user from local command mode or initiated by the FaxJack in the event it determines it has a corrupt version of the international country code table. Table 45 gives the message details of the Setup International Country Code Download command used in the preferred embodiment.

TABLE 45

Setup International Country Code Download Command

| Header |
| --- |
| Setup International Country Code Download Command - (23h) |
| Serial Number - Byte 1 |
| Serial Number - Byte 2 |
| Serial Number - Byte 3 |
| Serial Number - Byte 4 |
| Encrypted Key - Byte 1 |
| Encrypted Key - Byte 2 |
| Encrypted Key - Byte 3 |
| Encrypted Key - Byte 4 |
| International Country Code Table Version - Byte 1 |
| International Country Code Table Version - Byte 2 |
| International Country Code Table Version - Byte 3 |
| International Country Code Table Version - Byte 4 |
| FaxJack Software Version Number - Byte 1 |
| FaxJack Software Version Number - Byte 2 |
| Checksum - Byte 1 |
| Checksum - Byte 2 |

The Setup FaxJack Download of Setup Parameters command is sent from a FaxJack to a SmartPOP to request a download of the setup parameters for the FaxJack. This command is generally a result of the SmartPOP issuing a call back command to the FaxJack at an earlier time in which the SmartPOP instructs the FaxJack to request a download of its setup parameters at a later time. This command can also be issued by the user from local command mode or initiated by the FaxJack in the event it determines it has a corrupt version of its setup parameters. Table 46 gives the message details of the Setup FaxJack Download of Setup Parameters command used in the preferred embodiment.

TABLE 46

Setup FaxJack Download of Setup Parameters Command

| Header |
| --- |
| Setup FaxJack Download of Setup Parameters Command - (24h) |
| Serial Number - Byte 1 |
| Serial Number - Byte 2 |
| Serial Number - Byte 3 |
| Serial Number - Byte 4 |
| Encrypted Key - Byte 1 |
| Encrypted Key - Byte 2 |
| Encrypted Key - Byte 3 |
| Encrypted Key - Byte 4 |
| FaxJack Software Version Number - Byte 1 |
| FaxJack Software Version Number - Byte 2 |
| Checksum - Byte 1 |
| Checksum - Byte 2 |

The Setup Statistical Data Upload command is sent from a FaxJack to a SmartPOP to request an upload of the statistical data acquired by the FaxJack. This command is generally the result of the SmartPOP issuing a call back request at an earlier time in which it instructs the FaxJack to upload all or part of its statistical data at a later time. This command can also be initiated by the FaxJack in the event it has reached the maximum capacity of one or more of its statistical counters or by the user in local control mode. Table 47 gives the message details of the Setup Statistical Data Upload command used in the preferred embodiment.

TABLE 47

Setup Statistical Data Upload Command

| Header |
| --- |
| Message Length - (0Fh) |
| Setup Network Directory Download Command - (25h) |
| Serial Number - Byte 1 |
| Serial Number - Byte 2 |
| Serial Number - Byte 3 |
| Serial Number - Byte 4 |
| Encrypted Key - Byte 1 |
| Encrypted Key - Byte 2 |
| Encrypted Key - Byte 3 |
| Encrypted Key - Byte 4 |
| FaxJack Software Version Number - Byte 1 |
| FaxJack Software Version Number - Byte 2 |
| Checksum - Byte 1 |
| Checksum - Byte 2 |

The Statistical Data Upload command is sent from a FaxJack to a SmartPOP along with the statistical data to be uploaded. The block number indicates the data being uploaded. Table 48 gives the message details of the Statistical Data Upload command used in the preferred embodiment of the invention.

TABLE 48

Statistical Data Upload Command

| Header |
| --- |
| Message Length |
| Statistical Data Upload Command - (26h) |
| Block Number |
| Number of Statistical Data Bytes |
| Statistical Data - Byte 1 |
| Statistical Data - Byte 2 |
| . . . |
| Statistical Data - Byte n |
| Checksum - Byte 1 |
| Checksum - Byte 2 |

In the preferred embodiment, the amount of statistical data that can be uploaded in any one message is 255 bytes.

The Setup Data Upload command is sent from a FaxJack to a SmartPOP along with all the setup data from the FaxJack. Table 49 gives the message details of the Setup Data Upload command used in the preferred embodiment of the invention.

TABLE 49

Setup Data Upload Command

| Header |
| --- |
| Message Length |
| Setup Data Upload Command - (27h) |
| Number of Setup Data Bytes |
| Setup Data - Byte |
| Setup Data - Byte 2 |
| . . . |
| Setup Data - Byte n |
| Checksum - Byte 1 |
| Checksum - Byte 2 |

The length of the message is dependent on the number of setup data bytes.

The Statistical Data Invalid command is sent from a FaxJack to a SmartPOP and indicates that the statistical data stored in non-volatile memory (NVM) at the FaxJack is not valid. This in response to a Upload Statistical Data command if the FaxJack has determined that the statistical data in memory is corrupted. In the preferred embodiment, this message is not sent if the statistical data is zero or no statistical data has been gathered, and it is only sent if the check sum for the statistical data is invalid. Table 50 gives the message details of the Statistical Data Invalid command used in the preferred embodiment.

TABLE 50

Statistical Data Invalid Command

| Header |
| --- |
| Message Length - (05h) |
| Statistical Data Invalid Command - (28h) |
| Checksum - Byte 1 |
| Checksum - Byte 2 |

The Start Statistical Data Gathering command is sent from a SmartPOP to a FaxJack and indicates that the FaxJack should start gathering statistical data and storing it in non-volatile memory (NVM). If there is valid data already stored in NVM, then the new data is added to that in NVM. If NVM is invalid, the statistical data section of NVM is cleared and the data that is gathered is stored at an appropriate time. Table 51 gives the message details of the Start Statistical Data Gathering command used in the preferred embodiment.

TABLE 51

Start Statistical Data Gathering Command

| Header |
| --- |
| Message Length - (05h) |
| Start Statistical Data Gathering Command - (29h) |
| Checksum - Byte 1 |
| Checksum - Byte 2 |

The Cancel Statistical Data Gathering command is sent from a SmartPOP to a FaxJack and indicates that the FaxJack should stop gathering statistical data and storing it in NVM. Any statistical data already in NVM remains in NVM and is not cleared. Table 52 gives the message details of the Cancel Statistical Data Gathering command used in the preferred embodiment.

TABLE 52

Cancel Statistical Data Gathering Command

| Header |
| --- |
| Message Length - (05h) |
| Cancel Statistical Data Gathering Command - (2Ah) |
| Checksum - Byte 1 |
| Checksum - Byte 2 |

When either a FaxJack or a SmartPOP is waiting to receive a message, it waits a given amount of time, hereafter referred to as the message timeout time, before it assumes that the other device is not going to answer. At this point, communications between the two devices are terminated and the device waiting for the response places the line on-hook.

The message timeout time is programmable within the FaxJack. In the event that a value has not been programmed, the default value is used, which corresponds to 1 second in the preferred embodiment.

The calculation to be performed for the checksum bytes that are the last 2 bytes of each message are now be described in detail hereinbelow.

The message checksum is a 2 byte (16 bits) sum of all the message bytes excluding the checksum bytes themselves. Any overflow beyond 16 bits is discarded. The least significant 16 bits of the sum constitute the message checksum. Checksum byte 1 contains the most significant 8 bits of the checksum and checksum byte 2 contains the least significant 8 bits.

When a FaxJack calls a SmartPOP, it may have a remote request such as to download the latest directory. Therefore, in an alternative embodiment, there is a byte in the initial message that indicates the request made from the FaxJack. In most cases, this is a fax request. Some of the commands include directory download, software download, setup, and registration.

In order to determine who sent which message, there is a source and destination field in each message. Further, command messages may be concatenated, thereby saving time for message transmission and reception of multiple messages.

In the preferred embodiment, there is specified a maximum length that a message can have, thereby defining the size of a buffer that stores the messages. For example, with one byte used for the length, this limits a message to 255 bytes.

The statistical data can be blocked out so that it can be uploaded and cleared in logical blocks. This allows for the statistical data to be sent at irregular intervals, and so it does not have to be all sent at the same time.

A further alternative for the initial FaxJack-SmartPOP protocol is to let the FaxJack send the first message between the FaxJack and the SmartPOP when they are initially connected. That way, the FaxJack can transmit the destination phone number to the SmartPOP as soon as possible.

Alternative method for the FaxJack-SmartPOP protocol is to force all messages sent between the FaxJack and the SmartPOP to be acknowledged. This allows the FaxJack and the SmartPOP to know when requests are actually carried out. Of course, this causes greater overhead than by using a communications method with does not use an acknowledgement scheme.

Further, there may be employed an initial handshake communications between the FaxJack and the SmartPOP before the FaxJack sends its initial message. This is not necessary if the FaxJack always knows that it is receiving messages from the SmartPOP, and the SmartPOP knows that it is always receiving messages from the FaxJack.

In an alternative embodiment, the SmartPOP sends the FaxJack a parameter that instructs the FaxJack that it is to carry on a call before an extended length of time has expired.

The protocol conversion required in order to accomplish a user-transparent carriage of the T.30/T.4 fax protocol over a fast packet (frame relay) network is now described in detail hereinbelow.

The fax protocol conversion process takes place using the following arrangement. A pair of fax DCEs (EIA class 1 fax modems or their equivalent functionality) conduct independent but mutually tracking fax sessions at each end of the frame relay network. An unreliable connectionless datagram transport service is used by a computing platform to carry information between the fax DCEs over frame relay links. The conversion protocol described herein is implemented on the computing platforms at each end of the fax connection.

The T.30 protocol is a half-duplex protocol. At any given time, the fax device at one end of the connection is either listening for a signal from the fax device or transmitting a signal to the fax device. T.30-defined silence intervals separate the line turnarounds between receiving and sending signals.

Fax devices exchange procedural control messages called commands and responses, which are composed of one or more HDLC frames. The final HDLC frame in a control message has a bit set to distinguish it from non-final HDLC frames. Since the frame carriers are half-duplex, the final frame bit is redundant (the last frame received before loss of frame carrier should always have its final frame bit set.) If a full-duplex carrier were used, the final frame bit would be necessary. A line turnaround follows after frame carrier is dropped, with the single exception being after a DCS final frame as described next.

Besides the HDLC signaling carrier, a high-speed carrier is used to perform image transfer. There are only two times when this carrier is used. After a final frame for a DCS command, a training frame (TCF) is also sent using the image carrier, after which the line turns around. After a CFR final frame is sent, the fax device receiving CFR (if CFR was received error-free) raises its image carrier and commences transmitting image data. After the image data has been sent, the image carrier is dropped and a post page command is sent using the frame carrier, after which the line turns around again.

Commands compel responses. In a fax session where the document transmitting and receiving roles of the fax devices have been established, the transmitter issues commands and the receiver issues responses. The transmitter uses a 3-second timeout (T4) in receiving responses to perform ARQ error recovery for commands. Any errored frame in a command causes that frame to be dropped silently by the receiver. If the transmitter's command receives no response for 3 seconds, it retransmits the command. This can be repeated for up to a total of three commands, after which a DCN is transmitted and the line is disconnected.

Instead of waiting for 3 seconds for the sending fax device to retransmit an errored command, the receiving device can use the line turnaround as an opportunity to transmit a response containing the CRP frame. This response causes the previous command or response to be immediately retransmitted. This can shorten the time for an errored frame to be retransmitted.

The procedure by which fax devices conduct document transfer is specified in the ITU-T T.30 recommendation, which is incorporated herein by reference. The following describes the actions taken by a facsimile device. There are two main paths, one for a transmitter and one for a receiver. A transmitter is a fax device that sends a document, a receiver accepts the document.

Fax sessions follow a general pattern of:

Phase A. Establish the voice path.

Phase B1. Identify device capabilities. (Option) Change the transmitting/receiving roles of the devices.

Phase B2. Set the transmission carrier and performing training.

Phase C. Send a page of data.

Phase D. Perform a post page procedure to determine which of B1, B2, C, or E should be performed next.

Phase E. Hang up the line.

B1/B2 comprise the pre-message procedure, C is the in-message procedure, and D is the post-message procedure.

In receiving control messages during a fax session, there are two distinct flowchart "subroutines", called "Command received?" and "response received?" These are denoted CR? and RR?, respectively. A basic difference between these two routines is that RR? directly applies a timeout parameter (T4) while waiting for control message carrier, and CR? always returns immediately in the absence of the carrier.

Another distinguishing characteristic of CR? and RR? is the way they are used in the main flow diagram by the transmitter and receiver. In B1 the pre-message procedure the receiver uses RR? in obtaining the transmitter's response, and the transmitter uses CR? to obtain the receiver's initial identification. In B2 and D, the usage of CR? and RR? is reversed: the receiver employs CR? and the transmitter employs RR?. In this arrangement, it is clear that the compeller always employs RR?, and the compelled always employs CR?.

After C, one of four outcomes is possible:

1. All transmittable pages have been sent. The session ends (E).

2. There are more pages to be transmitted in association with the previously transmitted page(s). The transmitter and receiver bypass the entire pre-message procedure and immediately begin transferring the next page (C).

3. Not all pages have been transmitted, but the current transmission settings need adjustment (retraining). The need to retrain is always determined by the receiver. The identification and direction-setting part of the pre-message procedure (B1) is bypassed and the fax devices resume the session at training (B2).

4. The transmitter requires the fax session to continue at the beginning of the pre-message procedure, either to begin transmitting the next document or to switch roles and receive the next document. In order to accomplish this, the transmitter ceases issuing commands for at least T2 seconds. The receiver senses the absence of commands and restarts the identification phase of the pre-message procedure (B1).

The fax modems at each end of the conversion arrangement convert between voice band analog fax signals on an analog interface (subscriber loop or DS0) and baseband digital signals over RS-232 in an ASCII format defined by an EIA extension to the industry standard AT modem command set, EIA-578. Each fax-specific command and response of the fax modem begins with the two characters "+F". HDLC frames and image data are passed over the DTE interface in ASCII streams whose format is defined by the standard. The fax modem fully buffers received HDLC frames and performs CRC checking. The conversion of a typical 3-frame command or response is illustrated in FIG. 9.

Before pages are transmitted, both LEC ends of the connection simultaneously train their connections. This establishes the image transfer rate for the image phases. The near (transmitting) end should evaluate the far (receiving) end training result before indicating a training result to its fax device. There are several outcomes before the near end fax device is informed of a training result, as given in Table 53.

TABLE 53

Training Result Outcomes

| Case | Near end trained ok? | Far end trained ok? | Near end informed? |
|------|----------------------|---------------------|--------------------|
| 1 | no | no | no |
| 2 | no | no | yes |
| 3 | no | yes | no |
| 4 | no | yes | yes |
| 5 | yes | no | no |
| 6 | yes | no | yes |
| 7 | yes | yes | no |
| 8 | yes | yes | yes |

Of the cases shown in Table 53, case 8 is the only case where the near end fax device is always signalled that training succeeded and that the image phase may proceed. Cases 1–4 and 6 can be most simply handled by always reporting a training failure to the near end fax device. This is justifiable for the following reasons:

If the near end fails to train (cases 1–4), the far end retrains. If not, the far end "times out" waiting for an image phase to begin while the near end retrains. It is possible to spoof the far end into retraining at the same (high) rate while the near end trains to a new (lower) rate. During the image phase EOL fill could be sent to the far end fax device to keep the it from timing out when the far end modem's transmit buffer runs dry. This is of no use since the session proceeds at the near end rate anyway and only introduces new possibilities for the session to fail.

In case 6, if the near end fax device proceeds to the image phase while the far end retrains, it "times out" at the end of its image phase waiting for the far end fax device to reply about the received page (the network buffers the page as well, but that poses no difficulty). Spoofing over this with CFR would only result in increased session time to transmit the same number of pages. The near end fax device would have to retransmit the page, and the ongoing page transmission at the far end would have to be "trashed" in order to get the devices to synchronize their retraining. Again, this introduces new possibilities for the session to fail.

In the remaining cases 5 and 7, the near end has trained successfully but cannot determine the far end training result due to a network error. It is reasonable to assume that the far end training has succeeded more than half the time, so in these cases the near end fax is spoofed with an indication that training succeeded (CFR).

A similar situation arises at the far end. At that end, the conclusion of training demands a response from the near end to either retrain or begin the image phase, but far end may not receive the response due to a network error. At the far end, it is reasonable to assume that the near end training has succeeded, so the far end proceeds to raise its image carrier and stall from that point as necessary.

In the preferred embodiment, Automatic Repeat Request (ARQ) is used to compensate for frame relay network errors. ARQ protocols support error-free transmission by implementing explicit message acknowledgment and automatic retransmission for a limited number of iterations while an expected acknowledgment is not received after a specified ARQ timeout. The ARQ timeout is normally the worst-case round-trip delay between the sender and the receiver and starts with every transmission and retransmission. A tentative worst-case delay for the expected network implementation can be budgeted based on the round-trip delay components as given as follows:

| | | |
|---|---|---|
| End system routers and PCs | 50 ms | (cisco 4500/P51 486-3/Solaris-x862.4) |
| End system CSUs/DSUs | 50 ms | (estimated) |
| 2xIXC delay | 400 ms | (estimated) |
| Central routing delay | 50 ms | (estimated) |
| ARQ timeout | 550 ms | |

Basic "synchronous" ARQ schemes may employ a fixed timeout for every message and require each message to be acknowledged before any new message is sent. More complex schemes may support variable timeouts, may employ windowing that permits multiple acknowledgments to be concentrated/pipelined (TCP windowing for TCP segments for example) and may support out-of-sequence selective ARQ on multiple messages (fax ECM mode for example). The goal of these schemes is to minimize the impact (in bandwidth and delay) of ARQ overhead in a manner appropriate for the transmission medium and application domain.

The fax signal conversion needs to appropriately pack and unpack the baseband fax signals into and out of datagrams for transmission through the frame relay network and simultaneously perform context-dependent alterations to the fax signals that compensate for network delays and errors, all in a protocol-compatible manner. There are four objects defined for this purpose: a line object (line) 810, the fax signal packetizer (FSP) 820, the fax signal regenerator (FSR) 830, and the T.30 engine (T30E) 840. These objects are all illustrated in FIG. 10.

Each object has a specific focus in addressing the conversion process. The line object and its interfaces encapsulate the "what" (signals), the FSP/FSR encapsulate the "how" (buffering, packetizing, spoofing methods), and the T30E encapsulates the "when" (session management, line turnaround, spoofing control).

In this model, all buffering, flow control, and error recovery is handled. In the implementation environment the duplication of these responsibilities should be avoided or carefully quantified whenever it compromises the accuracy of the analyses in this mode.

In the case of DTE port driver buffers, as long as the time to copy the data into the process address space during a read operation is negligible compared to the time taken for the data to arrive in the driver buffer, the effect on this model is negligible.

Modem-resident buffers are more of a problem, because there are two bottlenecks involved. The data is slow to arrive, being detected off a voiceband carrier at 14400 bps or less, and slow to depart, being received through a DTE interface at not more than 115 kbps. The amount of data in the modem is kept as close to zero as possible at all times. Finally, network driver buffers in OS may be present to allow multiple tasks's output requests to be queued. This is a source of additional delay that are carefully measured and monitored. For instance, the FSP might always make synchronous writes (which return only after the data is "out the door", or in the ethernet card at least) and update an SNMP-visible peak meter on the write time. This time is included at run time as one of the factors defining the worst-case round-trip time through the network.

The line object is a conduit for signals to an actual fax device. In this model signals sent and received through the line object have negligible propagation delay to and from the fax device (other that the fundamental limits of the physical signals themselves). The line object implements an adaptation layer that translates the input/output signaling interfaces of the FSP/FSR into appropriate actions necessary to transmit and receive the corresponding physical signals using the fax modem. For an attached EIA-578a fax modem, the line object converts between the FSP/FSR input/output signaling requests and the AT+F ASCII commands and <DLE><ETX>-terminated data streams used by the fax modem. The line object can be modified to adapt the interfaces of other fax devices (e.g. DSP voice boards) to the FSP/FSR without affecting the FSP/FSR.

The line interface to the FSP/FSR provides the ability to transmit and receive the following signals:
call progress
control message carrier
baseband control message frames
image carrier
baseband image data Unlike ordinary fax terminals, the line object supports the detection of incoming hangup supervision. When an incoming hangup is detected, the line object should signal the corresponding line object at the far end to signal outward hangup supervision as soon as possible in order to extinguish LEC charges.

The line object enforces the outward hangup semantics of an ordinary fax terminal. Signaling outward hangup supervision to the line object automatically implies inward hangup supervision.

A fax session is conducted by two T30E's operating as back-to-back peers. The T30E conducts the operation of the FSP/FSR to carry out one of three physical-layer conversions in one direction at a time. These are call progress tones, control messages, and image data. Each T30E follows the T.30 flow diagram in order to establish the context in which it performs its interactions with the FSP/FSR. Each T30E's flowchart context is complementary to its local fax device and peer T30E. The actual fax devices are "shadowed" by T30Es operating at the terminating side of the network. The T30E's implementation of the flow diagram differs for the following reasons:

Only fully automatic Group 3 procedures are supported. None of the optional (dotted) decision points or actions are supported. These are all related to "procedural interrupts"—suspensions of the fax session due to manual (operator) intervention—and to Group 1 and Group 2 tonal signaling.

The T30E includes the actions associated with call progress monitoring and hangup supervision (i.e., completion of phase A and phase E).

Hangup supervision can terminate the call at any point in the flow diagram.

Commands that are dropped by the T30E are also dropped by the fax device it shadows.

Responses that are received by the T30E may ultimately be lost by the fax device it shadows.

The T30E initializes the FSP/FSR at the beginning of each fax session. Initialization causes the FSP/FSR to reset their internal state variables and enables the FSP/FSR to transmit datagrams and receive acknowledgments. For the FSR, the following configurable parameters are also initialized.
spoof frame values (if available):NSF/CSI/DIS, TSI/DCS
remaining T1 time The T30Es begin the fax session by commanding the FSR/FSP to transport call progress signals. Receiving a CED tone enables each T30E to begin executing the T.30 flow diagram; otherwise an unrecoverable protocol error occurs.

The T30E connected to the receiving fax device operates as a transmitting station in the T.30 flow diagram. It receives signals from the receiving fax device through its FSP in a conventional manner. It also generates the following signals via its FSR:
1. command/training frames
2. image data
3. post page command frames The FSR is responsible for supplying these signals; however it is possible for the FSR to fail to do so (presuming no spoof is possible). In general, the only option is to disconnect.

Because of the back-to-back arrangement, a response has two opportunities to be lost: once at the transmitting T30E in the network and once at the actual transmitting fax device. If the T30E loses a response, the fax device also loses it, so both devices remain at the same context in the T.30 flow diagram. But if a T30E receives a response which is ultimately lost by the actual fax device it shadows, the fax device may follow with an ARQ command retransmission while the T30E is ready to proceed at some other point in the flow diagram. As a transmitter, there are four responses that are subject to this behavior.

Response to DCS: If the response is FTT, the T30E and fax device remain in sync. If the response is CFR, the T30E is prepared to retransmit DCS if the transmitting fax device lost CFR.

Response to MPS: For any response received, the T3OE is prepared to retransmit MPS if the response is lost by the transmitting fax device.

Response to EOP: For MCF or RTP, the fax session is finished for all practical considerations. If the transmitting fax device fails to receive the response, it does not impact the result at the receiver. Therefore the T30E should always issue DCN and hang up the line. This minimizes LEC charges. For RTN, the T30E expects to begin phase B2 (DCD/training) or to hang up, but it is prepared to retransmit MPS if the transmitting fax device lost the response.

Response to EOM: Regardless of the response a return to either phase B1 or B2 is possible, or a DCN is possible. The T30E is prepared to retransmit EOM if the response is lost by the transmitting fax device.

The T30E connected to the transmitting fax device operates as a receiving station in the T.30 flow diagram. It receives signals (CR?, RR?, training/image data) through its FSP in a conventional manner, which are packetized and delivered across the network transparently to the T30E (except for unrecoverable network errors). In generating its signals to the fax device through the FSR, there are only three possibilities:
1. identification frames
2. training response frames
3. post page response frames The FSR is responsible for supplying these signals. However, it is possible for the FSR to fail to do so (presuming no spoof is possible). For commands (1), the only option is to disconnect. For responses it is necessary for the T30E to presume that silence is the only signal that could be transmitted, and proceed from that point.

Commands that are received with an FCS error or are otherwise found misformatted may be dropped by the T.30 receiver. Because of the back-to-back arrangement in this model, a command has two opportunities to be dropped: once at the receiving T30E in the network and once at the actual receiving fax device. If the T30E detects control message carrier but no command (due to either an FCS error or an absence of a command), the fax device should repeat this outcome so that both devices remain at the same context in the T.30 flow diagram. This is supported by transporting control message carrier but no frames. The FSR at the opposite end of the network supplying the receiving fax device with the command issues only control message carrier and no frames. This arrangement disambiguates a dropped command from a T2 timeout. If the T30E fails to receive control message carrier to the point where a T2 timeout occurs, this is repeated at the receiving end.

If the T30E receives a command which is ultimately dropped by the actual fax device it shadows, ordinary T.30-defined results are obtained.

Termination of the fax session occurs when a DCN control message or hangup supervision is detected or effected at any point in the fax session. To end the fax session at each end of the connection, both T3OEs issue outward hangup supervision, and inward or outward hangup supervision preferably needs to be signaled end-to-end. Thus, a consistent method for handling the hangup supervision signaling between the T30Es is utilized.

In this model, the fax session is conducted between two two-way trunk pairs (one at each end) and an intermediate network. A simple way to handle the exchange of hangup supervision would be to regard the network as an intermediate telco trunk linking the existing pair of trunks at each end of the connection, and simply carry the fax device-signaled hangup supervision end-to-end, as shown in FIG. 11. This approach utilizes a first protocol converter 910 and a second protocol converter 920, where each of the converters 910, 920 receives outbound hook state and inbound hook state information from the respective fax devices 10, 12.

However, this approach is not taken for two reasons:

The fax sessions at each trunk are independent in this model. The concept of end-to-end trunk supervision between the fax devices does not apply.

Hangup supervision is directly linked to the semantics of the fax session at each end. Each T30E should take unilateral action in effecting hangup supervision at its end when DCN is transported or in response to an unrecoverable protocol failure, in order to immediately extinguish LEC charges. This does not conform to the end-to-end trunk supervision concept.

There are six distinct events, listed below, that signal the end of a fax session to the T30E. The listed actions taken by the T30E in response to these events are intended to attempt to provide the opposite end of the fax session with a positive indication of its conclusion only if it the opposite end is not already implicitly aware of it:

1. A DCN frame is transported through the FSP:
   The T30E immediately commands the FSR to hangup the line. It then wait for the FSP's transmit buffer to drain.
2. Incoming (line to FSP) hangup supervision is detected through the FSP by the T30E:
   The T30E immediately commands the FSR to hangup the line. If the FSR returns an indication of hangup supervision at the other end, no further action is necessary. Otherwise the T30E commands the FSP to transport call progress, which carries the hangup supervision to the FSR at the terminating end. The T30E then waits for the FSP's transmit buffer to drain.
3. An unrecoverable protocol failure not covered by (1) or (2) is detected through the FSP:
   The T30E immediately commands the FSR to hangup the line. The line object ensures that inward hangup supervision is accomplished at the same time the FSR signals an outward hangup. Then the T30E can proceed identically as in (2).
4. A DCN frame is transported through the FSR:
   The T30E immediately commands the FSR to hangup the line.
5. Remote hangup supervision (incoming or outgoing) is detected through the FSR by the T30E:
   The T30E immediately commands the FSR to hangup the line.
6. An unrecoverable protocol failure not covered by (4) or (5) is detected through the FSR:
   The T30E immediately commands the FSR to hangup the line. If the FSR returns an indication of hangup supervision at the other end, no further action is necessary and the T30E immediately exits the state device. Otherwise the T30E commands the FSP to transport call progress, which carries the hangup supervision to the FSR at the terminating end. The T30E then waits for the FSP's transmit buffer to drain.

Termination concludes with the T30E disabling the FSR/FSP.

The FSP converts the signals provided by the line object into appropriately formatted datagrams and sends them to the FSR. The FSP performs the conversions under the direction of the T3OE. Through the FSP the T30E can monitor signals transported into the network in order to conduct the T.30 protocol.

The FSP performs call progress transport, control message transport and image data transport, as requested by the T30E. Call progress transport is used to detect the tonal signaling (CED) of the called fax device. This enables the T30E to determine when the T.30 call establishment phase has been successfully concluded (or not).

In control message transport, the FSP waits for frame carrier and collects T.30 frames in buffers until a final frame is detected, sending the carrier and frames through the network to the FSR with as little latency as possible. The T30E can inspect the most recently received control message after its final frame is received.

The FSP maintains a counter that reflects the number of times the currently buffered control message has been sequentially received. This information is used by the T30E in moderating its actions.

The FSP only performs message carriage and does not examine message content other than to detect a final frame and the occurrence of repeated control messages. No filtering of the frames can be accomplished by the T30E through the FSP.

In performing image data transport, the FSP is commanded by the T30E to detect a particular image carrier and carry an entire T.4 image stream between the line object and the FSR. The FSP attempts to detect the carrier and if successful, perform the packetization of the T.4 stream. Otherwise the FSP indicates a failure to detect the carrier, after which the T30E may indicate a new carrier or take other action.

The FSP sends the FSR datagrams that carry the call progress, control message, and image data provided by the line object. Flow control and ARQ error recovery specific to the particular variety of data being transported is applied. The datagrams are presumed to be carried over an unreliable network transport. The FSP attempts to keep network errors from propagating to the terminating fax device, much the way lower layer transmission problems from higher layer protocols in a OSI stack.

The datagrams sent by the FSP include from two to five fields. The FSR sends only acknowledgments and only if requested. The first two fields of all datagrams are:

1. Message identifier (required)—this field contains a unique identifier for a message in the context of the current network connection, and indicates if the message is being originated or acknowledged. If originating, the message identifier also indicates if an explicit acknowledgment is requested. It is necessary for ARQ handling.
2. Accounting field (required)—this field contains the unique call identifier of the CDR and the minimum information necessary to accurately bill the call at the time of transmission. This consists of LEC time and kilobytes transferred at the sender's end. By including this information in every datagram, each end of the connection always has enough information to generate an accurate CDR to bill the call regardless of when and how the call terminates.

Acknowledgments include only the message identifier and accounting fields. If the message is not an acknowledgment, one or more of the following fields are present:

1. Carrier field (required)—this field indicates the presence and type of carrier detected by the fax modem. This field is always present if a data field is present, in order to indicate the type of data (frame or image). For call progress signals, this field indicates which of the tonal/supervisory signals was reported by the fax modem (ringback, busy, SIT, CED tone, or hangup).
2. Data field (optional)—this field contains either the control message frames or T.4 image data, as indicated by the carrier field. If frames are being provided, the type and number are defined as well. If image data is being provided, the offset and length of the data relative to the beginning of the image phase is included.

The image data in the data field does not include any leading carrier bytes. All EOLs within the image data have a uniform alignment and not more than 7 fill bits. Errored lines are transported as received. This is necessary since filtering them could result in image data underflow at the far end. This is also in accordance with the network being a transparent medium to the fax devices.

Because of the real-time nature of the information in datagrams, all datagrams are expected to be transmitted without fragmentation. That is, no datagram's size is allowed to exceed the path MTU of the network.

Call progress signals and control messages have several unique characteristics that drive the implementation of their transport:

1. All call progress signals and control messages can be communicated within a single datagram.
2. New call progress signals and control messages immediately supersede previously received ones.
3. Call progress signals and control messages change at a rate ranging from about equal to, to within an order of magnitude of, the worst-case round-trip network delay. Periods when signaling rates may approach the ARQ timeout can be defined but the actual occurrence of such events cannot. For instance, during call establishment on the terminating end of a fax session, a change in call progress information may occur rapidly (busy signal) or after a few seconds (CED). During control messages, the inter-frame arrivals may occur anywhere from within a small fraction of a second to three seconds.

All of these conditions result in a very simple buffering scheme and special ARQ treatment. only one call progress and control message buffer is necessary in the FSP and FSR. In the FSP, ARQ needs to be extinguished whenever a buffer is updated while an acknowledgement is pending.

Call progress ARQ retransmission ceases once a control message is ready to be transmitted. Receipt of the initial control message at the originating end implies receipt of a CED call progress message.

The T.4 image stream experiences the one-way delay in propagating through the network. As a consequence, the image phase of the fax session at the terminating end lags the image phase at the originating end. The image phase lag time is an important factor in the transport and is symbolized as L.

There are two other factors that contribute to L. First, packetizing the image stream imposes a delay to accumulate an amount of image data that is efficient (ratio of payload to overhead should be high).

Second, overcoming network errors with retransmissions adds delay. All three components are given the following labels: $L_D$, the intrinsic one-way network delay, $L_P$, the packetization delay, and $L_E$, the error recovery delay. The following analysis uses $L_D$=0.3 s. In order to use the transmission resources efficiently, the image payload to transport overhead ratio should be high, which tends to increase $L_P$. For UDP/IP on ethernet the transport overhead is 8+20+18=46 bytes and the payload may range from 18 to 1472 bytes. Allowing margin for the non-image data fields in the datagram, approximately 1400 bytes are available for actual image data. The transport efficiency achieved is a function of the image rate R and packetization delay $L_P$:

$$\text{transport efficiency} = [R * L_P] \text{ bits}/8 \text{ bits/byte}]/1518 \text{ bytes}$$

The maximum transport efficiency is 1400/1518=92.2%. The required minimum $L_P$ for maximum transport efficiency can be expressed as:

$$L_P = 11200/R$$

The following table lists these values for the supported image rates given in Table 54.

TABLE 54

| Supportable Image Rates | |
| --- | --- |
| R | $L_p$ |
| 14400 | 0.77s |
| 12000 | 0.93s |
| 9600 | 1.16s |
| 7200 | 1.56s |
| 4800 | 2.33s |
| 2400 | 4.67s |

L is limited by the requirement that the receiving fax device's post page response (PPR) to the sending fax device's post page command (PPC) be received by the sending fax device before the T.30 response timeout. Carrier spoofing and the sending fax device's post page command ARQ combine to set an absolute upper limit for returning a PPR equal to:

| | |
| --- | --- |
| PPR nearly times out (1st) | 3s |
| PPR carrier spoofed; times | 3s |
| PPC repeats (minimum) | 3s |
| PPR nearly times out (2nd) | 3s |
| PPR carrier spoofed; times out | 3s |

-continued

| | |
|---|---|
| PPC repeats (minimum) | 1s |
| PPR nearly times out (3rd) | 3s |
| PPR turnaround, max (TT$_{pprmax}$) | 17s |

This limit should not be approached regularly since it increases the total session time dramatically and be a likely source of transmission failures. This limit should only be approached when ARQ error recovery occurs. For error-free conditions, the terminating end's first PPR is returned to the originating end before the first response timeout of the originating end's PPC.

For this analysis, it is assumed that the carrier for the PPR at the originating end is spoofed just before the first PPC response timeout, providing just under a 3 s delay. An additional 2 s is budgeted for idle carrier time before the PPR is received from the terminating end. Thus a total of 5 s is available to return a PPR. This time is labeled $T_{PPRAV}$.

During this 5 s, the PPC is relayed to and regenerated at the terminating end. It is assumed that the PPC experiences the same one-way delay as the image stream. The receiving fax device is expected to return a PPR to the terminating FSP within 3 s (it may take longer and be within the T.30 protocol but 3 s is the amount of time budgeted by this analysis). The response experiences a one-way delay to arrive at the terminating end for transmission. Therefore, the total turn-around time to get the PPR to the originating end is 3.6 s. This time is labeled $T_{PPR}$.

$T_{PPRAV}$, $T_{PPR}$, and $T_{PPRMAX}$ establish limits for $L_P$ and $L_E$; $L_D$=0.3 s has already been accounted for in these terms. For no ARQ error recovery ($L_E$=0), $L_P \leq L_{PMAX} = T_{PPRAV} - T_{PPR} = 5$ S–3.6 s=1.4 s This represents the maximum available packetization delay that can be imposed while still responding with the first PPR before the first PPC response timeout occurs. When an ARQ error recovery period occurs, L is increased by $L_E$. The total available time for ARQ error recovery is limited (for any successful image phase) by $L_E \leq L_{EMAX} = T_{PPRMAX} - T_{PPR} - LP = 17$ s–3.6 s–$L_P$=13.4 s–$L_P$ However, there is the additional constraint on an ARQ recovery period of the 5-second EOL fill timeout, which begins at the terminating end as soon as it runs out of image data. If a window scheme is used, the absolute upper limit on accomplishing ARQ recovery is set by the 5 s EOL timeout plus the time taken at the receiving end to drain the most recently sent window. The values used above may be adjusted to provide for optimum performance, based on the requirements for a particular application.

Multiple ARQ recovery periods may occur within an image phase. These may have a cumulative effect on L ($L_E = \Sigma L_{E(i)}$). If buffers are implemented in the FSR, and the image data accumulated by the FSP during ARQ recovery periods is bursted to the FSR, then $L_E$ is determined by the peak accumulated image data backlog that occurs in the FSP during the image phase.

The discussion above identifies a limit on $L_P$. In order to apply this limit, the FSP requests image data from the fax modem subject to a timeout equal to the longest $L_P$ to be applied. To avoid fragmentation, the buffer size supplied with the request would typically be the largest image data block that can be transmitted in the path MTU. This arrangement allows $L_P$ to be automatically reduced to its optimum value when image rates are high enough to always fill the buffer before the supplied maximum $L_P$ expires.

Figure 12:
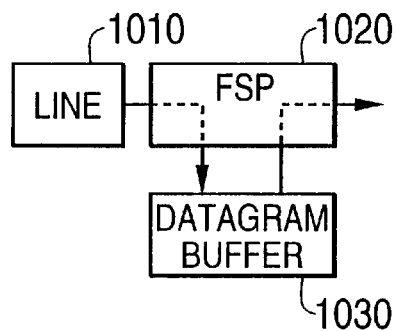
FIG. 12 illustrates a single buffer scheme between the line object and the FSP for packetizing the image stream that can be used with the system according to the invention.

The simplest buffering scheme between the line object 1010 and the FSP 1020 would have a single buffer 1030 for packetizing the image stream, as shown in FIG. 12.

Figure 13:
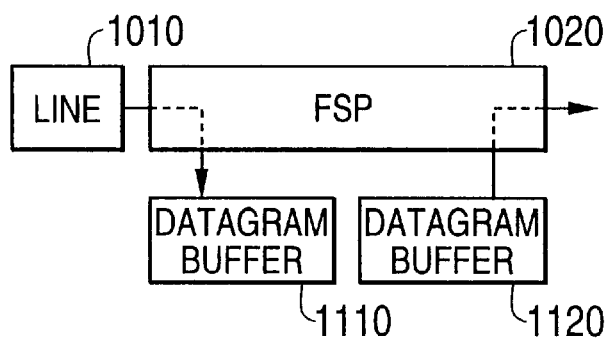
FIG. 13 shows a ping-pong FIFO arrangement that can be used with the system according to the invention.

In order for this to be workable, the worst-case time to receive acknowledgements (the ARQ timeout) should be negligible compared to the packetization delay (ARQ timeout<<$L_P$). This is not the case for this model. The next simplest arrangement is a ping-pong FIFO, which is configured as a first datagram buffer 1110 and a second datagram buffer 1120, as shown in FIG. 13.

This scheme allows one ARQ timeout to overlap the packetization time for the next image datagram, and requires that ARQ timeout $\leq L_P$. The generalization of this approach results in an n-deep FIFO of datagram buffers, where ARQ timeout $\leq (n-1) \cdot L_P$ The size of this FIFO is preferably further increased to accumulate image data from the fax modem during a worst-case ARQ recovery period. That is, the actual constraint that is to be met by the FSP's buffering scheme is $L_{EMAX} \leq (n-1) \cdot L_P$ The FSP determines when $L_{EMAX}$ has been exceeded in order to indicate an unrecoverable error in the image phase transport to the T30E. If the FSR does not implement buffers to receive the ARQ recovery backlog, then the event of a FIFO overflow at the FSP indicates this condition. However, the FSR should implement buffers for accepting the backlog. This arrangement allows the effect of subsequent ARQ recovery periods to be mitigated by the backlog already available at the FSR. While the FSR continues to supply image data from its backlog, an ARQ recovery period does not contribute towards $L_E$. FIFO overflow at the FSP can still be used to detect when $L_{EMAX}$ has been exceeded as long as the FSP reduces its utilization of its own buffers by an amount equal to the backlog held at the FSR.

The FSP provides buffer space for the received image stream when requesting baseband image data from the line object. Given the presence of a large FIFO buffer in the FSP, the FSP has two options in providing the buffer space:

1. Make the total amount of remaining contiguous FIFO space available. This permits the $L_P$ timeout to be more closely approached at higher image rates.
2. Supply no more than a path MTU-sized block of buffer space from the FIFO.

For sufficiently high image rates, the effect of (1) is to supply multiple datagrams of image data to the FSP in one operation, but these datagrams would be emitted in clusters about every $L_P$ seconds by the FSP. Option (2) would result in a uniform distribution of the image datagrams for all image rates, so (2) is used in the preferred embodiment.

After each fax session, residual image data remains in the FSP/FSR buffers. In order to strictly adhere to the requirement that the network does not store fax data beyond the context in which it is being transmitted, these buffers are wiped clean.

An implementation may employ a FIFO of datagram buffers, or an equal-sized FIFO of characters that has a datagram buffer organization imposed upon as data is transported.

According to the preferred embodiment, a window scheme is used to send datagrams to the FSR. The FSP maintains a list of datagrams that have been sent and have pending acknowledgements. All datagrams that are covered by the most recently received acknowledgement are purged from the list. The FSP continuously sends datagrams from the FIFO until an acknowledgement from any sent datagram goes missing. When the ARQ timeout occurs, the FSP sends only retransmissions of the earliest unacknowledged datagram until it is acknowledged either explicitly, or implicitly by the acknowledgement of a datagram that was sent after it.

The Fax Signal Regenerator (FSR) performs a transport function that is complementary to the FSP. The FSR converts the datagrams provided by the FSP into signals sent to the line object. The FSR performs call progress transport, control message transport and image data transport, as requested by the T30E. Through the FSR the T30E can monitor received signals in order to conduct the T.30 protocol.

The FSR implements buffers to receive datagrams from the FSP. A single call progress buffer and a single control message buffer are provided. Image data is accumulated into a FIFO buffer.

When ARQ between the FSP/RSR cannot accomplish datagram transport due to severe network errors or other timing difficulties, the FSR on the receiving end may fail to receive the actual fax signals required to maintain the fax connection. In this case, the FSR can "spoof" the fax signals in order to compensate. Spoofing consists of supplying reasonably appropriate default fax signals to the line object when the FSP fails to supply them at the appropriate moment. The FSR's spoofing repertoire is under complete control of the T30E, which can enable, and disable the FSR's spoofing tactics as appropriate.

Note that spoofing does not compensate for fax session errors not associated with the network. Protocol conversion accomplishes fax transport in as session-transparent a manner as possible. No spoofing occurs when the fax session at each LEC end operates within the defined error conditions of T.30.

The FSR performs call progress transport as directed by the T30E. Call progress transport is used to supply the tonal signaling (CED) of the called fax device. This enables the T30E to determine when the T.30 call establishment phase has been successfully concluded (or not). To perform call progress transport, the FSR carries indications of the voice-band progress tones and CED tone received from the FSP to the line object. The FSR ends transport when CED is detected or call establishment fails (due to hangup, busy, SIT, or timeout).

The FSR can be implicitly configured to perform CED spoofing. This is actually a special case of control message spoofing. In CED spoofing, the FSR forces a CED tone to the line object at a time that keeps the actual fax device's T1 timeout from expiring. However, in the T.30 protocol the CED tone is immediately followed by the initial identification message. Therefore, CED spoofing is implicitly enabled when the T30E enables the FSR to spoof the first initial identification message. CED spoofing is performed at most once per call.

The FSR performs control message transport as directed by the T30E. In control message transport, the FSR receives datagrams from the FSP bearing frame carrier and T.30 frames. The FSR is allowed to send control message carrier and frames to the line object as soon as they are received or when spoofing is performed. After the final frame of a control message is sent to the line object, the FSR follows the control message with the T.30-defined silence interval to complete the control message transport.

In directing the FSR to perform control message transport, the T30E indicates which subset of the T.30 control message frames may be transported and what timeout to apply for commencing control message carrier. At least one final frame type is indicated in the subset. The FSR returns an "unexpected frame" error if it receives a frame from the FSP that does not match the subset allowed by the T30E. This behavior is consistent with the concept of an independent fax session occurring at each end. The T30E imposes order on the fax session at its end of the connection, based solely on its observations of fax signals received from the fax device at its end.

The FSR knows the correct T.30 relationship of optional frames to final frames, and applies the correct T.30 sequence for multiple optional frames. If the T30E specifies multiple final frames in the transportable subset of frames, the FSR restricts the subset to just one set of final and optional frames after it receives or spoofs an optional frame. The first final frame received or spoofed ends the control message transport and begins the silence interval.

If the FSR fails to receive any frame from the FSP within the specified timeout, and no spoof is available, it returns an indication to the T30E that no frame was transmitted.

The FSR maintains a counter that reflects the number of times a control message has been sequentially transmitted. This information is used by the FSR to enforce the "three strikes you're out" T.30 retransmission limit on the T30E. The FSR does not allow the same control message to be transmitted more than three times in a row; the fourth attempt by the T30E to transmit the same control message causes the FSR to recognize that ARQ has been exhausted. The FSR instead automatically transmit a DCN message and return an indication of the failure to the T30E.

The FSR can perform two kinds of control message spoofing: carrier spoofing and frame spoofing. In carrier spoofing, the FSR forces the control message carrier just before the T4 timeout expires. The T30E is responsible to apply carrier spoofing only when the local fax device is executing the RR?, T.30 subroutine, or the CR? subroutine only if it would not preclude a T2 timeout at that point in the protocol. In frame spoofing, the T30E configures and enables control message frames from one of the following three groups to be spoofed:

1. initial identification (NSF, CSI, DIS)
2. command (TSI, DCS)
3. training response (CFR or FTT)

In accordance with the considerations discussed in "Near End/Far End Training", when the T30E commands the FSR at the originating end to transport CFR or FTT, the T30E specifies which one of these may be spoofed according to the training result obtained through the fax modem at its end. CFR may be spoofed if training succeeded, FTT may be spoofed if training failed.

The FSR performs image data transport as directed by the T30E. The FSR receives datagrams bearing an image carrier and carries an entire T.4 image stream between the FSP and the line object. The FSR attempts to receive the carrier and, if successful, perform the depacketization of the T.4 stream. Otherwise, the FSR indicates a failure to detect the carrier, after which the T30E may take further action.

In accordance with the network being a transparent medium for fax sessions, the FSR cannot spoof actual image data. However, there are two mechanisms available for compensating for network errors during the image phase: image carrier spoofing and EOL spoofing. The FSR can be configured by the T30E to spoof the requested carrier if it is not received from the FSP within the T3 timeout. The FSR can also expand the EOL fill between scan lines without altering the image. In the preferred embodiment, this mechanism can cope with image data loss from the FSP for up to 5 seconds.

The functional and timing aspects of the dial access protocol to the network will now be described in detail hereinbelow. The interactions between the FaxJack and the SmartPOP that support network access are described on an abstract level. Encoding of actual messages and other implementation issues are not covered here.

There are several requirements that are met by an access method employing a CPE access device (known as the FaxJack):

User identification & authentication—the SmartPOP identifies the user for billing purposes, and distinguish authorized vs. unauthorized users.

Destination identification—the SmartPOP is told the intended destination telephone number.

Access device maintenance—the SmartPOP is able to move information to or from the CPE access device in order to deliver updates or to collect use statistics.

Access completion—the SmartPOP issues a "termination command" to tell the access device to disconnect itself and to either switch the fax device on-line or redial off-net.

T.30 time limits—the access protocol imposes an additional delay on the fax session for on-net calls and for calls that are placed to the SmartPOP that become off-net. The side effects of this delay are designed to have little or no impact on perceived quality of service.

Communications between the SmartPOP and the FaxJack take place using a V-series recommendation modulation. After the FaxJack dials the SmartPOP, it determines that the SmartPOP has answered. At that point, there are only two possible access sequences. These are listed below, with the FaxJack messages to the SmartPOP in normal type and the SmartPOP messages to the FaxJack in italics:

1. initial-id *disconnect*
2. initial-id *transfer-command* transfer-response *disconnect*

Any amount of delay may occur between each message (subject to a design budget for the total access sequence delay.) Hanging up the line from the SmartPOP is an implicit disconnect message. If at any point the SmartPOP or the FaxJack detects a misformatted message it hangs up the line. The FaxJack then redials through its first available alternate path (e.g., VPN or presubscribed carrier).

The total timing budget for completing the dial access protocol has a direct impact on the available T.30 T1 time implemented by the user's fax device; when T1 expires the fax device hangs up the line. T1 begins the moment the fax device finishes dialing the last digit of the destination fax number. The T.30 recommendation specifies T1 to be 35±5 seconds; however a particular fax device's implemented T1 time can vary drastically (although not below 30 seconds). The FaxJack can report the remaining T1 time in its initial message to the SmartPOP.

In addition to these requirements, a software equivalent to the FaxJack is accommodated in one of the following ways:

The choice of modulation scheme for the hardware FaxJack is compatible with a software-only access protocol implemented in the widest possible existing installed base of fax modems.

A separate trunk group and/or 800 numbers is provided to support software-only FaxJack access.

The stages in the access protocol that result in the initial FaxJack message arriving at the SmartPOP are listed in the following event sequence:

1. The FaxJack dials the last DTMF digit to the SmartPOP. (The FaxJack dials all preceding digits of the SmartPOP's telephone number coincident with the fax device dialing activity).
2. The LEC performs the local switching function and begins to signal the digital trunk controller in the SmartPOP modem rack.
3. The digital trunk controller causes the corresponding modem's DTE port ring indicator signal to assert. (If the modem is implemented with a voice board, an equivalent modem-to-application task signalling takes place over some vender-dependent hardware/software interface entirely within the PC). A ring response with ANI information may also be transmitted to the PC. (If FGD is available, the destination number may also be provided in this way).
4. The line processor task in the attached PC wakes up and issues an answer command through the DTE port to the modem.
5. The modem's answer tone (carrier) is generated and carried to the FaxJack.
6. The FaxJack recognizes that the SmartPOP has answered. It raises its transmit carrier and, after any training delay, transmits its initial identification message.
7. Upon detecting the transmit carrier, the modem issues a CONNECT response and the FaxJack's initial message to the PC.

At this point, a communication channel is established between the SmartPOP and the FaxJack and the first message has been received from the FaxJack. The FaxJack is now in a "slave" mode waiting to respond to SmartPOP commands. The SmartPOP processes the initial identification message and ANI information (if any) to determine how to proceed with the call.

The SmartPOP can send a disconnect message after receiving any FaxJack message. The disconnect message tells the FaxJack explicitly to redial or to switch the fax on line, or implicitly tell the FaxJack to redial. The possible cases of preceding FaxJack message condition and disconnect message type are specified in Table 55.

TABLE 55

| FaxJack Message Condition/Disconnect Type | |
|---|---|
| Condition of previous FaxJack Message | Disconnect message type |
| initial-id received OK | hangup, redial, on-line |
| transfer-response OK | hangup, redial, on-line |
| initial-id format error | hangup |
| transfer-response error | hangup, redial, on-line |

An explicit redial message is sent only when some additional information (such as a backoff message) is sent to the FaxJack. The on-line disconnect message can be issued after an errored transfer-response only if the initial-id message was received correctly.

The T1 loss from signaling delays include on-hook delay, dial tone delay, predial delay (delay between receipt of dial tone and the beginning of dialing), and DTMF dialing speed. On-hook delay is the minimum time to signal the exchange that the current service request is being terminated; a working figure is 1500 ms. Dial tone delay is statistically distributed and typically longer when the exchange is congested; a working figure for modern exchanges during the busy hour is 1000 ms. A typical predial delay is about 70 ms. DTMF dialing proceeds at a nominal rate of 10 digits per second where each digit's tone is transmitted for 50 ms and interdigit silence is 50 ms. Delays through digital carrier facilities are negligible.

When the FaxJack places a call to the SmartPOP, it overlaps the dial tone, predial, and dialing delay with the fax device's dialing activity. When T1 starts, assuming the FaxJack has determined that the destination number should be carried on-net, one DTMF digit is dialed. Since no interdigit silence is required, this digit takes 50 ms to dial. Therefore, the initial T1 loss for call placed to the SmartPOP is only 50 ms.

For destination numbers that the FaxJack determines should not be placed on-net, the FaxJack can make the determination no later than just after the last exchange digit of the destination is dialed by the fax device. The FaxJack hangs up the line, go of f hook again, and redial verbatim the actual destination number. The dialing delay for a 1+10 digit destination is typically incurred (1100 ms). The total redial time is (hang up+dial tone+predial+dialing)=(1500+1000+ 70+1100)=4.2 s. The hang up time, dial tone delay, and redial time of the destination number can overlap the time to receive the remaining station digits, reducing the loss of T1 time by at least 400 ms, to 3.8 s.

For destination numbers that the FaxJack redials after dialing the SmartPOP, the combination of SmartPOP dial time, SmartPOP communication, and redial time subtracts from the available T1 time. The SmartPOP dial time and redial time total is 4.25 seconds in the preferred embodiment. Of course, this time can be adjustable to suit a particular application.

The contribution of the access protocol to the loss of T1 time should desirably be kept to some acceptable minimum for calls that are redialed by the FaxJack. But at a minimum, the actions numbered 3–7 as described above are performed during the protocol, followed by a hangup at the SmartPOP.

A study of fax device connect times revealed that 90% of fax calls established a connection (V.21 carrier detected by a UDS FasTalk II fax modem) within 27 seconds. Dialing was performed through a PBX by using a two digit line prefix, waiting for a second dial tone, and dialing a 10-digit destination number and 3 digit accounting code.

The observation was made that

If 8 seconds were added to the dial time, the connection time for 90% of the calls would have been 35 seconds, the median T1 time as specified in CCITT t.30.

The assumption was made that

If this experiment were repeated with the fax devices of all customers of the fax network service, the fax devices would hang up no earlier than 35 seconds.

On the basis of this reasoning, if the FaxJack adds no more than 8 seconds of delay to the fax call when redialing around network congestion encountered at the SmartPOP, 90% of the redialed calls establish a connection within the existing fax session. Given that 4.25 s of signaling delay have been identified in the preceding section, 3.75 s are available for conducting message transfers using voice-band carriers and performing the associated access processing on the SmartPOP computing platform.

An object model of the software components of the SmartPOP are described in detail hereinbelow. The objects are first considered without regard to the number or arrangement of devices upon which they are implemented. After the device- and network-independent view of their behavior has been presented, further development of the model is undertaken to reflect the realities of particular device arrangements.

Extensive consideration of the requirements has yielded well-defined units of responsibility that constitute the SmartPOP objects. These are:

1. Line Processor—The LP is responsible for answering incoming calls, mediating the FaxJack session, coordinating the setup of a terminating LP, performing the T.30 protocol, and generating CDRs. There is one LP per LEC line. The LP encapsulates the communications hardware implementation, be it an EIA fax modem or a DSP board.

2. LP Allocator—The allocator is used by an originating LP to assign a terminating LP for a call. It performs the allocation function using local information at the terminating side of a call that is not available to originating LPs. The allocator attempts to commit the resources to terminate the call and responds appropriately.

3. LP Bandwidth Vector—The BV monitors the current disposition of transmission resources in the SmartPOP by recording consumed SmartPOP bandwidth per LP. It encapsulates the data structure and algorithm by which the availability of transmission bandwidth for fax sessions is determined.

4. Backoff Generator—The BGEN monitors the SmartPOP traffic and supplies backoff messages for access grooming based on the current level of traffic congestion and a user's access class. The LPs pass backoff messages to the FaxJacks in order to keep more profitable traffic on-net during periods of high blocking.

5. User Database—The UDB is a user-per-record database that is used to validate user access to the network, classify users to support access grooming, and coordinate FaxJack updates on a per-user basis.

6. Table Database—The TDB is a FaxJack directory update-per-record database that contains a copy of every FaxJack table version in use by FaxJacks that call the SmartPOP.

7. Allocator Database—The ADB converts a dialed telephone number into transport addresses that can be used to place LP allocation requests for the terminating side of a call.

8. Fax Capabilities Database—The FDB converts a local telephone number (local to the SmartPOP) into a description of the T.30 and other capabilities supported by a fax device at that number.

9. Billing Pipe—The BP is a CDR-per-record database. LPs add new records to the BP and an off-hours billing processor collects them.

10. Statistic Pipe—The SP is a statistics download-per-record database. LPs add new records to the SP and an off-hours network management operation collects them.

These objects and their interactions are detailed in the following subsections. In only two cases (originating LP to LP allocator, and originating LP to terminating LP) their interactions takes place through a data network (further development interposes a data network between other objects as well, but only for implementation reasons.) The only assumption made for these cases is that the data network provides an unacknowledged, unreliable datagram delivery service.

The line processor (LP) represents the physical resources that are dedicated for an entire call. Each SmartPOP has a number of LPs equal to the number of LEC access lines provisioned.

The SmartPOP stores all versions of the network directory table stored within the FaxJacks to direct a user call into the fax network. The existing voice network is used as a final route for traffic that cannot be carried on the digital network. The routing decision could be made within the SmartPOP, but this would incur an associated LEC charge for all off-net traffic. In order to eliminate LEC charges for off-net traffic, FaxJacks make the routing decision instead of the SmartPOP, by virtue of the network directory table stored at the FaxJacks and periodically updated via the SmartPOPs.

The routing decision in a FaxJack is based on information in the network directory table. This information corresponds to the NPA/exchange and a filter. For each dialed number, a bit in the filter is tested. If the bit is set, then the call is on-net and the SmartPOP is dialed. Otherwise, the call is placed through the subscriber's existing carrier. The filter includes: a) a bit vector having bits which correspond to international country codes, and b) a bit vector for each national significant number, having bits which correspond to local exchange number or city codes within that NSN (in the U.S., the NSN bit vectors correspond to NPAs (area codes) and are about 800 bits long).

Each FaxJack is nation-centric in format (NSN schemes vary by country) and filter setting (on-net settings vary by country).

The country codes portion of the table only provides filtering by country code. If there is a further filtering of international codes that depends on the locality within the target nation, it does not occur within the FaxJack. The NSN portion of the table provides filtering by locality within the NSN. In the U.S., any particular exchange within an NPA can be filtered.

A customized local exchange filter can force potentially on-net traffic when the LEC charges exceed a budgeted amount. The effectiveness of this method relies on the correlation of exchange numbers with the variability of LEC charges. If this correlation is low, cost averages of on-net traffic within the exchange are used to set the filter.

For FaxJacks within a single country, one collection of tables can be generated to match the current status of network coverage and LEC charge variations. Both of these parameters (coverage and LEC charges) vary with time, and require new tables to be downloaded to the FaxJacks by the SmartPOPs in their respective localities. Each new release of tables is sent to the SmartPOPs, which in turn update the FaxJacks. The tables are stored in the User Database within the Resource Manager of each of the SmartPOPs.

A segment of the network directory table is either the country code portion or any one of the NSN portions. FaxJacks receive all updates in units of segments. One segment may be transferred during the initial few seconds of an on-net all. Since the update of the FaxJack tables is driven by a user's on-net traffic behavior, it is possible for a user to have a FaxJack that is more than one release out of date.

In the preferred embodiment, the FaxJacks are provided with updates in a way that allows the updates of the latest release to be downloaded to a FaxJack, regardless of how many releases out of date its table is. At the same time the exact revision information for each FaxJack table is maintained in order to track updates. In one arrangement, the SmartPOPs maintain, in real time, version records for each segment of each user's FaxJack. This multiplies the size of the user database in the SmartPOP by a factor roughly equal to the quantity of table segments.

An alternative approach is possible, where complete knowledge of exact FaxJack table version content is reduced while still knowing exactly which segments need updating. This alternative approach which is used in the preferred embodiment relies on four components: a) SmartPOP user database fields: a table version number and a bit-per-segment bit vector, b) a table version SmartPOP database, c) a table update segment SmartPOP database, and d) table checksum, calculated by the FaxJack and reported at the beginning of every on-net call.

The table version number and bit vector in the user record indicates which table version is currently loaded into the FaxJack and which segments of the table are out of date. When the bit vector is all zeros, the user's FaxJack table is a completely up to date copy of the table version indicated in the version number field of the user's record.

The table version database and update segment database are both consulted on every on-net call. The result of these interactions updates the version and bit vector fields of the user's record and supplies the next update segment for a call.

When a FaxJack calls a SmartPOP, it announces its current table checksum and other identifying information. The SmartPOP looks up the user's record and obtains the table version and update vector. Then all three items are presented to the table version database. The table database performs the following actions. First, it compares the reported version/checksum information to the most currently configured tables for the SmartPOP. If the FaxJack's table version and checksum match, and the update vector is all zeros, no other action is taken. Second, if the user's version is out of date, it is overwritten with the latest version number. Then the bit vector is adjusted to reflect those segments that have changed between the previous and current table versions. The checksum is ignored. Third, if the version matches but the checksum does not, the result depends on the update vector. If the vector is not all zeros, then the FaxJack's table is in an intermediate state and no further action is taken. If the bit vector is all zeros, then the table in the FaxJack has a checksum error and is completely reloaded. The bit vector is then set to all ones.

After the interaction with the version database, the table update database is consulted to get the next update segment to deliver to the FaxJack. One of the following two outcomes is possible. In the first outcome, the bit vector is all zeros. No update segment is returned. In the second outcome, the bit vector has one or more bits set. The update database provides an update segment and indicates the segment's corresponding bit in the bit vector. If the segment is successfully delivered to the FaxJack, the SmartPOP resets the corresponding bit.

The priority order of delivery of update segments can be defined in any way desired within the update database. While FaxJacks could maintain a version number, there is little value in this since recovering from a version mismatch will in general require a complete download of the table.

The LP covers the following functional areas:

1. Recognize new incoming calls from FaxJacks, requests from an allocator to place outgoing calls, and handle simultaneous seizure by a FaxJack and an allocator in favor of the FaxJack.
2. Generate requests for a terminating LP in another SmartPOP to create the fax "circuit". Support alternate routing of terminating LP requests to alternate SmartPOPs.
3. Validate the format (but not content) of the initial identification message from a FaxJack. Coordinate data exchange between the FaxJack and the SmartPOP databases during phase A of a fax session, overlapping with terminating LP allocation.
4. Perform physical and link-layer protocol conversion between the fax device on its LEC line side and the data network on its WAN port side. This requires demodulating and remodulating the fax signals were they enter and exit the SmartPOP, and implementing an ARQ-based error correcting protocol to convert between T.30 frames and T.4 synchronous image data to a packet-mode format that is compatible with modern fast-packet data networks.

5. Record call information while the call progresses, and submit a CDR to a SmartPOP billing database.

The LP's behavior on the originating-side of a typical call can be divided into four phases:

1. Begin a new call: validate the user, check for updates, allocate bandwidth, get a backoff message, get fax caps, initialize a CDR, and get an allocator address.
2. Allocate a terminating LP, perform FaxJack transfers (if any).
3. Perform fax session conversion with the terminating LP.
4. Terminate the call: write a CDR and statistics record (if any).

On the terminating side, there are three similar phase:

1. Begin a new call: allocate bandwidth, initialize a CDR, and begin outward dialing.
2. Perform fax session conversion with the terminating LP.
3. Terminate the call: write a CDR.

The fax session transport conversion algorithm is defined by a state device.

LPs can be used to provide local exchange only fax transmission support, merely by configuring the other objects in the SmartPOP appropriately. This would carry fax traffic out of the SmartPOP and then right back in. optimizations to routing tables or other elements for carrying local traffic efficiently (for instance, by avoiding unnecessary consumption of LAN/WAN transmission facilities) are not important at this time.

When an LP accepts a new call, it obtains a terminating LP located in a SmartPOP in the destination fax device's local calling area. Originating LPs do not maintain real-time status of the availability or transport addresses of potential terminating LPs in the network, but obtain this information from an LP allocator located in the SmartPOP where a terminating LP is needed. Each SmartPOP has an LP allocator that knows (through the bandwidth vector) the availability and address of every LP in its own SmartPOP. Originating LPs get an allocator address for the destination calling area by consulting a director called the allocator database (described below).

The allocator consults the BV to determine which LP should be committed to the call (if any). The allocator then sends a message to the LP to request it to begin the terminating side of the call. If simultaneous seizure of the LEC line occurs, the incoming call in honored and the allocator's request is denied.

Duplicate requests from an originating LP are discarded. The allocator's interaction with the BV indicates if the request has already been assigned an LP; if it has, the request is ignored.

The transmission bandwidth accounting is necessary when the aggregate image rate supported by the LPs on the LEC side of the SmartPOP can (in any possible traffic configuration) exceed the available bandwidth on the WAN port side of the SmartPOP. This has been the case in typical configurations thus far. The BV models the available SmartPOP bandwidth to reflect the physical resource available to carry traffic, whether they be LPs, shared media networks, or bidirectional digital carrier systems. The BV separately accounts for send-only and receive-only image phase bandwidth. Fax session image phases are typically send-only from the originating LP. More traffic may be supported by distinguishing each-way bandwidth reservation.

The BV implements transmit, receive, and total bandwidth parameters for the maximum available and currently consumed transmission capacity, and per-LP records of the consumed SmartPOP bandwidth. The consumed transmit bandwidth is the total of the assigned transmitting bandwidth in the per-LP records. Similarly, the consumed received bandwidth is the total of the assigned receive bandwidth assigned in the per-LP records. The total consumed bandwidth is the total of these two figures. None of the consumed bandwidth figures may exceed the maximum available transmit, receive, or total parameters.

The per-LP data serves the additional purpose of identifying duplicate terminating LP requests, by including each call's transactions identifier. Duplicate request detection is included in BV's behavior because it naturally coexists with the per-LP data serving BV's primary purpose.

Bandwidth for the session is allocated in the send-direction at both ends of the fax "circuit" (at each LP) at the beginning of each call, to support the highest image rate possible in the send direction on that call. Bandwidth is re-allocated by the LPs as the call progresses to match actual needs.

Since the working capacity of a SmartPOP is a configurable parameter for these objects, the BV can be used to support "statistical overcommit" of the SmartPOP, by configuring it to model transmission capacity that exceeds the actual physical capabilities of the SmartPOP.

The backoff generator (BGEN) provides congestion control for the SmartPOP traffic. During periods of high congestion, BGEN provides an LP with a "backoff" message to be delivered to a FaxJack. This message causes a FaxJack to dial a specific fraction of its normally on-net traffic off-net for a specific time interval. Since more customers are more profitable than others to carry on-net, BGEN enables the SmartPOP to groom more profitable customers on-net and less profitable customers off-net.

Every time an LP originates a new call, part of its call handling involves requesting an appropriate backoff message from BGEN (if any is to be sent to the FaxJack). The LP supplies BGEN with the customer's access class, which is an index of the cost to carry the customer on-net and is part of the user database record for the customer. BGEN monitors the SmartPOP bandwidth in order to determine when a level of blocking has been reached that justifies issuing backoff messages, and uses the supplied access class to set parameters for backoff messages it generates.

An implementation where almost no traffic overflows to a common carrier final route is possible, using a virtual private network service as the first alternate route. In this case, there is no gain to be made in grooming higher profit per minute traffic on-net while the net is saturated, since each path is a sunk cost. But until such an arrangement is present throughout the net, the BGEN provides a way to enhance profitability.

The user database (UDB) is a user-per-record database that is accessed in order to perform the following functions.

1. Validate user access to the network. This is accomplished by checking FaxJack serial numbers, checking actual vs. expected ANI, checking access permission assigned to the customer, and issuing updated encryption keys on a regular basis. Encryption keys are used to decrypt a portion of the FaxJack's initial message and verify that its content is correct. Permanent serial numbers are assigned to FaxJacks and are announced in the FaxJack's initial identification message. Access permissions are functional checks on service permissions and may be set to enable setup sessions or to enable actual fax service, or they may be reset for service cancellation or "credit hold" purposes. ANI checking is an optional method that can be supported, but it may not be available or workable for some customers.

2. Classify users to support access grooming. A single field in the user's record contains an index identifying the cost of carrying the user. This value is used by an algorithm in the BGEN to keep higher-profit traffic on-net when only carrier final routes are available.

3. Coordinate FaxJack updates on a per-user basis. Each FaxJack holds a particular network directory table. Within a SmartPOP's local area, one or more of these tables are defined (one for each economic access class calling the SmartPOP) and periodically updated. Updates are downloaded to FaxJack.

The UDB retains two encryption keys in each record: the current key and the new key to replace the current key. This is necessary because the FaxJack may successfully receive the new key while the LP fails to receive a confirmation. When this happens, the UDB current key is incorrect, but the new key is correct. Therefore, if a previous attempt to update the FaxJack with the new key was not confirmed, and validation with the current key fails, the LP attempts validation with the new key and update the current key in the UDB if validation with the new key succeeds.

For coordinating updates, the user's record includes a network directory version number, network directory checksum, and a bit vector of pending update segments whose bits are set to indicate a segment that has yet to be downloaded to the FaxJack. As pending updates are downloaded to the FaxJack, their corresponding bits in the bit vector are reset and the FaxJack's network directory approaches the exact configuration defined by the user's current directory table version. After the last pending update is delivered, the bit vector is all zeros. The FaxJack recalculates and announces its network directory checksum at the beginning of each call. When the bit vector is all zeros, the checksum reported by the FaxJack should match the checksum in the SmartPOP.

The table database (TDB) is a FaxJack directory update-per-record database that contains a copy of every FaxJack table version in use by FaxJacks that call the SmartPOP. Each record of the TDB corresponds to one update segment of a network directory table, and is keyed on a table version number and segment update sequence number. Each record includes the sequence number of the next update segment for the same table version. One segment is delivered to a FaxJack per on-net call. Each UDB record indexes one segment within the TDB; as each segment is downloaded the UDB record is adjusted to index the next update segment.

Each segment is small enough to be completely delivered to a FaxJack before the initial answer from the terminating LP is received. The FaxJack sends a confirmation to the LP when it successfully receives an update. If the LP does not get a positive confirmation, it retransmits the segment. Each segment has at-least-once semantics.

The LP performs only a physical- and link-layer transport function that delivers update segments in a monotonic sequence following the order of their appearance in a record. From the SmartPOP's perspective, delivery of the segments is completely independent of their content.

The allocator database (ADB) is a directory that associates telephone numbers with SmartPOP allocator addresses. The ADB defines a binary relation where the combination of country code, national significant number (NPA), and city code (or exchange) serves as one element and a list of SmartPOPs with allocator addresses serves as the other.

The ADB is a used by an LP to determine a network address of a target SmartPOP allocator to receive a call setup request. When an LP looks up an allocator address in the ADB, one of three outcomes is possible:

1. The SmartPOP list is empty. This is the case when there are not any SmartPOPs that serve the given telephone number. This can occur when a FaxJack with an out-of-date or errored network directory table directs a call on-net that should have been placed off-net. The LP eventually sends a disconnect message to the FaxJack.

2. One SmartPOP allocator address is present in the SmartPOP list. The address is passed to the LP>

3. Multiple SmartPOP allocator addresses are listed. The ADB chooses one of the allocator addresses, at random or by some other means, to be returned to the LP. This is intended to provide additional traffic control in areas (San Francisco bay area for example) where several geographically distributed (or at least physically disjoint) SmartPOPs may be equally suitable as sources of terminating LPs for certain calls.

The ADB includes a field for each listed SmartPOP that indicates the expected round-trip transmission delay in microseconds for traffic between the local SmartPOP and the listed SmartPOP. LPs may use this information to optimize their ARQ algorithm.

The fax capabilities database (FDB) converts a local telephone number (local to the SmartPOP) into a description of the T.30 and other capabilities supported by a fax device at that number. The FDB comes into play in two cases, described below.

1. When an LP originates a call, it queries the FDB (with the FaxJack- or ANI-supplied caller's number) to determine the calling fax device's capabilities. This information is included in the terminating LP request that is sent to the destination SmartPOP's allocator. The allocator passes this information to the allocated terminating LP (if allocation succeeds) to enable it to spoof a T.30 DCS command that is within the supported capabilities of the originating fax device.

2. When an LP begins handling the terminating side of a call, it queries the FDB (using the destination number) to obtain the capabilities of the destination fax device. This information is included in the response to the allocator, which is forwarded to the originating LP, enabling it to spoof a T.30 initial answer (DIS) that is within the capabilities of the destination fax device.

The FDB is maintained directly by the LPs on a change-only basis. At the conclusion of each call, if an LP observes a difference between the fax capabilities announced by the fax device on its side of the call and the capabilities reported by the FDB, it updates the FDB directly.

The billing pipe (BP) is a high-integrity reservoir for CDRs generated by all the LPs in a SmartPOP. Because the BP's data is extremely valuable, its implementation supports high-integrity data handling.

1. The LPs of a cell send all their billing records to the BP with an error-correcting protocol; the records are retrieved for billing operations via another error-correcting protocol.

2. The BP is capable of accepting bill data at peak cell traffic rates for a period of 60 days without data loss, after which it discards new records in order to retain existing records. The BP maintains statistics on the number and value (in resources consumed) of all discarded billing records. The statistics are resettable.

3. In the event of power or other catastrophic failure that does not directly destroy the BP or its accumulated billing data, a means of recovering that data is supported. The BP recovers any billing data previously accumulated when it reinitializes after a SmartPOP failure.

The statistics pipe (SP) is a reservoir for statistics downloaded from FaxJacks. Its operation closely parallels the BP, although the same degree of data integrity is not required. However, the implementation of this object should reuse the implementation of the BP as much as possible.

The objects' interactions are listed hereinbelow in a C++ style, in the format

SendingClass(es)→ReceivingClass::Message

These names and notations are for conceptual purposes; they may or may not be used as class members of an actual implementation.

1. LP→UDB::Validate User takes the initial FaxJack message and returns and indication of whether access should be granted.
2. LP→BP::NewTransaction creates a "blank" CDR in the BP and returns a unique transaction identifier for the call.
3. LP→UDB::GetUpdateIndex returns the TDB record index of the next update message for the indicated user or an indication that no updates are pending.
4. LP→TDB::GetUpdateSegment obtains the next update segment from the TDB as indexed by the UDB.
5. LP→UDB::UpdateConfirmed tells the UDB to advance to the next update segment (if any).
6. LP→BGEN::GetBackoffMessage returns the applicable backoff message under the current conditions of the SmartPOP resources and supplied user class.
7. LP→ADB:: GetAllocatorAddress returns a transport address for an allocator that corresponds to the supplied destination telephone number.
8. LP→FDB::GetFaxCaps returns the T.30 capabilities for the supplied local number's fax device.
9. LP→FDB::GetFaxCaps updates the T.30 capabilities for the supplied local number's fax device that are stored in the FDB.
10. LP→BP::WriteCDR accumulates the call history in the BP for customer billing.
11. LP→SP::WriteStats accumulates downloaded FaxJack statistics.
12. LP→BV::GetBw commits unidirectional image-phase transmission resources (if available) during a call.
13. LP→BV:: FreeBw releases image-phase transmission resources assigned to a call.
14. LP→Allocator::AllocateLP attempts to commit an LP in the allocator's SmartPOP. Returns can indicate success, failure, or may timeout.
15. LP→LP::SessionMessage conducts the T.30/T.4 protocol conversion messages between LPs. Its return is another SessionMessage or a timeout.
16. Allocator→BV::GetTermLp identifies the next most suitable LP for assignment to the terminating side of a call, or indicates that there are not resources for the call or that a terminating LP has already been assigned to the call.
17. Allocator→LP::Seize attempts to commit a terminating LP for outward dialing. The LP attempts to seize the line and to commit bandwidth for the call via the BV. If successful, the LP immediately begins dialing the destination number.
18. Allocator→LP::AllocResponse informs an originating LP of the outcome of an allocation request.

The objects described above provide the required functionality in the SmartPOP, but are only meant as a way of example, and not as a way of limitation. Note, however, the distribution of these objects onto a fault-tolerant, scalable arrangement of devices creates a need for some additional objects that provide more controllability and enhanced efficiency of the architecture within the implementation context. This section discusses an arrangement of devices on which the objects described above can be run, and the following discussion presents a recasting of the objects as necessary to support such an arrangement of devices conveniently and efficiently.

A single-device platform for supporting the objects is undesirable because it provides no fault-tolerance. A dual-redundant device would be sufficient, but this does not address the need for scalability.

Although scalability through technology upgrades is always possible, scalability through additional capacity alone is provided, i.e., adding devices of like performance to the existing plant, in order to support additional LPs and scale the performance of the other objects to cope with the additional LPs. Design aspects of this scalability are:

1. There is some upper limit on the number of LPs that can be supported on a device. The scalability in LPs are in units of these devices (and then in units of LEC lines).
2. The scalability of all other objects is achieved by implementing them in a distributed manner.
3. For simplicity, devices are configured to support either LPs or the other objects, but not both simultaneously.
4. The ratio of devices that support LPs to devices that support the other objects is (theoretically) constant over the scalable range of the implementation, given specific performance targets for the non-LP devices. In practice it is a step function of the number of LP devices in the SmartPOP.

The step function in (4) above defines a cell. One cell has one device devoted to all non-LP functions, referred to as the Resource Manage, or RM. The other devices that host LPs are called LP Arrays, or LPAs. LPA traffic that exits a cell leaves through directly connected WAN ports and never enters other cells in the same SmartPOP.

There is another definition of a cell that has been considered, where a fixed number of LEC lines and a single WAN port is assigned per cell. This determines the number of LPs per cell and imposes the performance requirement on the RM device to support the determined number of LPs. This definition is too rigid for two reasons:

1. Given the desire to use identical device technology for the RM and the LPAs, it is possible to have an RM that is either under- or over-loaded by the cell's LPAs.
2. The ratio of WAN port bandwidth to LEC lines is not fixed over time. As fax standards advance, this ratio increases to accommodate higher image rates.

Adjusting the ratio in (2) is an important requirement that can be accomplished by either reducing the number of LPAs per cell and increasing the number of cells, or by expanding the WAN port bandwidth. The former method would reduce the load on the RM, leaving the RM underutilized. The latter method would require an implementation that supported WAN port expansion. It may also require increasing the number of LPAs per cell to make efficient use of the expanded WAN port, and that would further require the RM to accommodate the increased LPA load in the cell. To summarize, the former method induces a marginal underutilization of the RM after expansion, and the latter method requires underutilizing an RM before expansion.

Within a single cell, the RM is a single point of failure, so it is necessary to have one or more of the LPAs capable of taking on the role of RM if the primary RM fails. Not all LPAs need to have this capability. A minimal SmartPOP configuration would consist of one cell with three devices: two LPAs (at least one of which supports failover as an RM) and a primary RM.

This following describes changes to the objects described above that accommodate their implementation over the scalable, distributed device arrangement also described above. These changes introduce new objects and interactions that explicitly cope with the distributed implementation.

The RM-hosed objects (numbered 2–10 as discussed above) need to behave as singletons, yet they are distributed over as many RM devices as there are cells. The scalable range of 24–10,000 LEC lines implies that the objects are either undistributed, residing on 1 RM in 1 cell, or distributed over 2–70 cells (in the case of 144 LEC lines per cell). If it were possible to simple "clone" the RM objects, one per cell, then distribution would be achieved merely by running multiple, independent instances of the objects. All RM objects within a particular cell would do their jobs without being aware of the other instances in the other cells. They could even contain different instance data and not be actual clones.

The bandwidth vector, backoff generator, user database, table database, allocator database, and fax capabilities database operate as true clones—each RM hosts an exact replica (ideally) of these objects. The billing and statistical pipes do not need to be clones but can be "instanced". Each pipe accumulates data that is only associated with the traffic its cell carries.

Given the operating assumptions for distributing the RM objects mentioned above, there are two remaining issues to be solved in making these objects behave as singletons in spite of their distribution:

1. For cloned objects, a mechanism for replicating and delivering updates to all copies (one on each RM) is required.
2. For instanced objects (the BP and SP), a mechanism for aggregating their instances into a singleton is required.

(2) is not really a problem for the SmartPOP, in that the cells never use the BP and SP as singletons. only back office processing is concerned with obtaining all information from all instances. This is trivially solved by performing one download per cell and merging the data.

(1) comes in four types:
1. Updating configurable parameters—This is an update that takes place between the NOC and the SmartPOP, typically using SNMP. In this case it is a simple matter for the NOC to cope with replicating and distributing the update over all cells.
2. Uploading new database records/versions—Again, this is an operations issue that can be handled as above.
3. Updating database records directly as a result of traffic activity—This case applies to the user and fax capabilities databases only. When a new FaxJack encryption key is delivered to a FaxJack, all copies of the user database are updated to enable the FaxJack to be recognized on its next call, no matter which cell it reaches. Similarly, changes to the fax capabilities database are propagated to all cells in order to enable the fax device to be accurately identified no matter which cell it is connected to on its next call.
4. Updating all copies of the bandwidth vectors when send/receive bandwidth is allocated or freed—This case arises because LPs alter the BV residing within their own cell. However, the BVs of all cells have complete, consistent information about the state of all LPs throughout the SmartPOP.

For (3), A direct approach to replication could use NFS to update the clone databases directly. A more efficient approach would use a network broadcast to pass updates to all clone copies of a database at once. In order to avoid broadcast storms, this would have to be an unacknowledged broadcast. Database tracking would have to be guaranteed with an off-hours database maintenance procedure. However, this approach reduces $O(n^2)$ update traffic to $O(n)$. This approach is also suitable for updating the Bvs in (4). These new interactions are introduced:

1. UDB→UDB::BcastUpdate replicates local cell changes to the UDB to all copies in other cells.
2. FDB→FDB::BcastUpdate replicates local cell changes to the FDB to all copies in other cells.
3. BV→BV::BcastUpdate replicates local cell changes in the BV to all copies of the BVs in other cells.

The "clone and separate" approach to accommodating distribution over the cells can be worked out for most objects but are not possible with the allocator; the ADB is affected as well. Without cells, each SmartPOP allocator is a single addressable entity in the network and the ADB associates one allocator transport address with each phone number. With a cell arrangement, the allocator resides at multiple addresses, one per cell. As a consequence, when an LP looks up an allocator in the ADB, the allocator address returned is selected at random from those available at a given SmartPOP. In single-cell SmartPOPs, the same address is always returned.

The BV's response to the GetTermLP interaction is modified when the next most suitable LP resides in another cell. In this case the BV returns an allocator address to which the request should be forwarded. The allocator forwards the request to the allocator residing in that cell and take no further responsibility. Therefore the BV and allocator are cell-aware, and allocators support a new interaction:

Allocator→Allocator::ForwardRequest passes a terminating LP request to an allocator in another cell.

Since the allocator that receives the LP's request for a terminating LP may not be the allocator that ultimately satisfies the request, an originating LP accepts an acknowledgement from any allocator in the SmartPOP, no matter which cell's allocator was originally addressed.

As described above, the ADB already selects from among multiple SmartPOP allocator addresses when more than one SmartPOP is suitable for the terminating side of a cell. Distributing the allocator introduces another level of selection, when more than one allocator (cell) may be available within the selected SmartPOP. These two levels of selection should remain distinct, because they exist for completely different reasons:

The ADB allocator selection described above supports physically disjoint allocators. If allocation fails with the selected allocator, there is the remaining possibility that allocation at one of the other allocators could succeed. This arrangement is unrelated to distributed implementation side effects.

The ADB allocator selection described above supports a distributed allocator in one SmartPOP. All cells of this allocator are physically and logically united. If allocation fails from one cell, allocation has effectively failed in all cells of that SmartPOP.

The allocator detects and discards duplicate requests. Under distribution, it is still possible for duplicate terminating LP assignments to be made, because the state arrays may not be able to monitor all LP states with perfect synchronization. When a duplicate assignment results, the originating LP decides (by honoring replies from just one terminating LP) which of the duplicates actually are to be used for the call. A timeout or an active dismissal by the originating LP may be used to return any duplicate terminating LPs to an available state.

Figure 14:
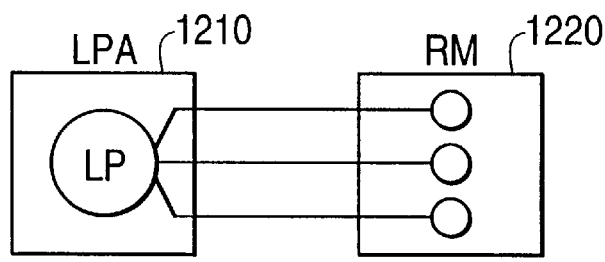
FIG. 14 schematically illustrates the LP-RM traffic carrying multiple object interactions across the LAN.

The LP-RM traffic carries multiple object interactions across the LAN. This is illustrated schematically in FIG. 14, with the connectivity between the LP Allocator (LPA) 1210 and the Resource Manager (RM) 1220 as shown.

Figure 15:
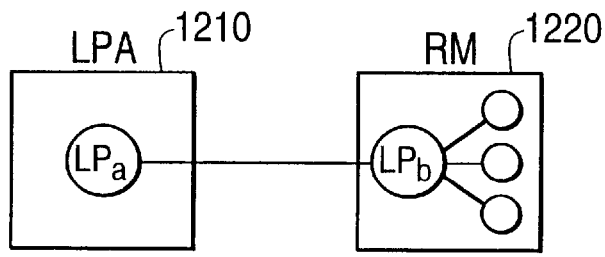
FIG. 15 illustrates interactions of line processors with the resource manager objects according to the invention.

However, in beginning each new call the LPs interact with the RM objects in a predictable way. The interactions that "get the call started" (numbered 1–8 as discussed earlier) are always performed in some fixed sequence for every successful call; the sequence is terminated early only when the call fails for some reason. These interactions take a corresponding number of messages over a LAN to accomplish, but they all may be performed in just one message by breaking the LP into two components, one on the LPA 1210 and one on the RM 1220, as shown in FIG. 15.

The interactions numbered 1–13 as discussed above are no longer performed directly by an LP on the LPA; $LP_b$ performs these interactions on behalf of $LP_a$ as required. From the LPA, $LP_b$ can be viewed as a facade the decouples $LP_a$ from the RM-hosted object interfaces. (From the RM, $LP_a$ can equally be viewed as a facade that decouples $LP_b$ from interactions with FaxJacks and fax devices.) The complete functionality of the LP is distributed over $LP_a$ and $LP_b$. The interactions between $LP_a$ and $LP_b$ are:

1. $LP_a \rightarrow LP_b$::BeginCall Performs all actions required to begin an originating or terminating call. For originating calls it supplies the initial FaxJack message. It performs all actions with the RM objects to begin the call, and returns all the information necessary to the LP to proceed appropriately with the call, in a single message or possibly is a series of returned messages.
2. $LP_a \rightarrow LP_b$::ReallocBw changes the default bandwidth allocation supplied at the beginning of the call.
3. $LP_a \rightarrow LP_b$::EndCall supplies a CDR, statistics record, FaxJack update confirmation and FDB update as appropriate to end a call.

Interactions numbered 14, 15, and 18 as discussed above are conducted with the $LP_a$ component of the LP. In the allocator-initiated interactions, seizure (interaction 17) is directed to $LP_b$, and response (interaction 17) is directed to $LP_a$ in the originating SmartPOP.

Since the $LP_a$ component of the LP is fax protocol-oriented, and the $LP_b$ component is call control-oriented, $LP_a$ is referred to simply as the LP and $LP_b$ is referred to as the call processor, CP. When referring to "the LP", the context establishes whether both the $LP_a$ on the LPA and the $LP_b$ on the RM is being referred to, or just $LP_a$.

All new object interactions are summarized below:
1. CP→UDB::ValidateUser takes the initial FaxJack message and returns and indication of whether access should be granted.
2. CP→UDB::GetUpdateIndex returns a TDB record index for the next update message for the indicated user or an indication that no updates are pending.
3. CP→TDB::GetUpdateSegment obtains the next update segment from the TDB as indexed by a UDB record.
4. CP→UDB::UpdateConfirmed tells the UDB to advance to the next update segment (if any).
5. CP→ADB: :GetAllocatorAddress returns a transport address for an allocator that corresponds to the supplied destination telephone number.
6. CP→FDB::GetFaxCaps returns the T.30 capabilities for the supplied local number's fax device.
7. CP→FDB::SetFaxCaps updates the T.30 capabilities for the supplied local number's fax device that are stored in the FDB.
8. CP→BGEN::GetBackoffMessage returns the applicable backoff message under the current conditions of the SmartPOP resources and supplied user class.
9. CP→BP::NewTransaction creates a "blank" CDR in the BP and returns a unique transaction identifier for the call.
10. CP→BP::WriteCDR accumulates the call history in the BP for customer billing.
11. CP→SP::WriteStats accumulates downloaded FaxJack statistics.
12. CP→BV::GetBwcommitsunidirectional image-phase transmission resources (if available) during a call.
13. CP→BV::FreeBw releases image-phase transmission resources assigned to a call.
14. LP→CP::BeginCall Performs all actions required to begin an originating or terminating call.
15. LP→CP::ReallocBw changes the default bandwidth allocation supplied at the beginning of the call.
16. LP→CP::EndCall supplies a CDR, statistics record, FaxJack update confirmation and FDB update as appropriate to end a call.
17. LP→Allocator::AllocateLP attempts to commit an LP in the allocator's SmartPOP. Returns can indicate success, failure, or may timeout.
18. LP→LP::SessionMessage conducts the T.30/T.4 protocol conversion messages between LPs. Its return is another SessionMessage or a timeout.
19. Allocator→BV::GetTermLP indicates either (1) the identity of the next most suitable cell-resident LP for assignment to the terminating side of a call, or (2) an allocator address to which the request should be forwarded, or (3) that there are no resources for the call, or (4) that a terminating LP has already been assigned to the call.
20. Allocator→Allocator::ForwardRequest passes a terminating LP request to an allocator in another cell.
21. Allocator→CP::Seize attempts to commit a terminating LP for outward dialing. The CP attempts to cause the LP to seize the line and then attempts to commit bandwidth for the call via the BV. If successful, the LP will have immediately begun dialing the destination number.
22. Allocator→LP:AllocResponse informs an originating LP of the outcome of an allocation request.
23. UDB→UDB::BcastUpdate replicates local cell changes to the UDB to all copies in other cells.
24. FDB→FDB::BcastUpdate replicates local cell changes to the FDB to all copies in other cells.
25. LPState→::BcastUpdate replicates local cell changes in the state vector to all copies in other cells.

There are two SNMP MIBs (one for LPAs, one for RMs) that define the maximum SmartPOP configuration supported. The configuration of objects on the LPAs and RMs is driven by attribute values of these MIBS.

Figure 16:
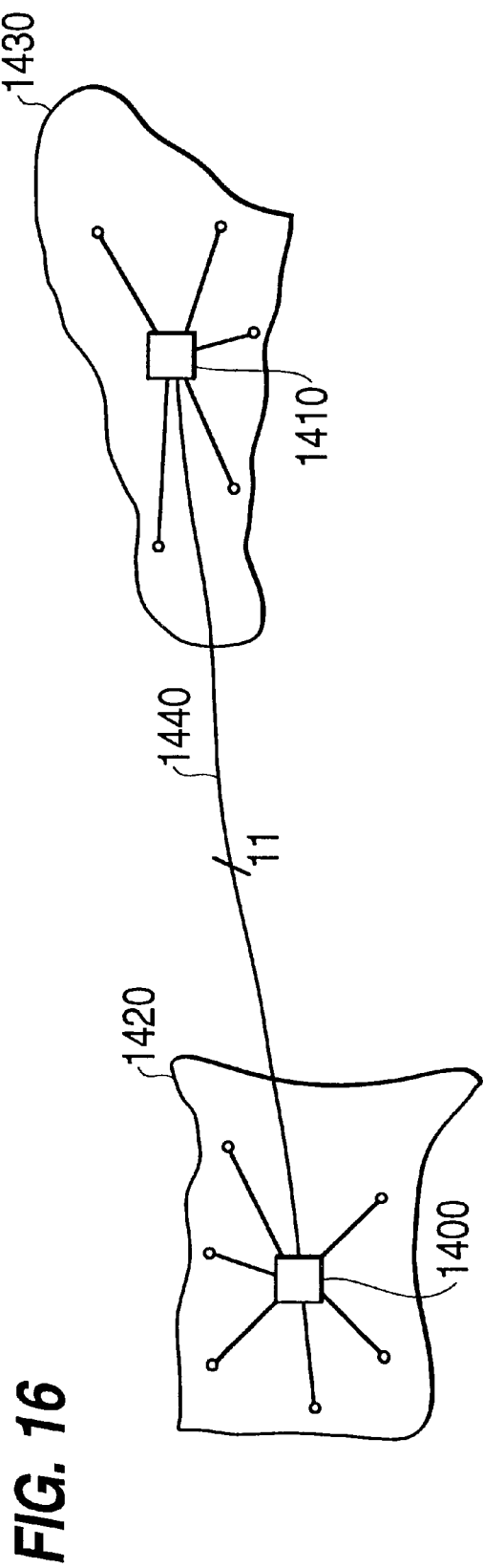
FIG. 16 shows a digital network that can be used with the system according to the invention, in which virtual Smart-POPs are used to provide communications between Smart-POPs and source/destinations devices in two separate networks.

Another issue related to the SmartPOP-SmartPOP network is the method of packet routing that may be utilized in order to send packets of fax data from a sending fax device to a receiving fax device. FIG. 16 shows a setup with a centralized routing SmartPOP 1400, or first virtual SmartPOP 1400 in a first network 1420 (i.e., in the United States) and a centralized routing SmartPOP 1410, or second virtual SmartPOP 1410, in a second network 1430 (i.e., in Europe). In the routing map as given in FIG. 16, a plurality of digital lines 1440 connect the first and second virtual SmartPOPs 1400, 1410 at each of the two networks. Note that each virtual SmartPOP 1400, 1410 is connected to all of the SmartPOPs in their respective networks. The above-described routing scheme lessens the number of routing paths between SmartPOPs, but may result in congestion problems at the respective routing centers if not enough output lines are allocated to the respective routing centers.

The virtual SmartPOPs 1400, 1410 provide a connection from one network of SmartPOPs to another network of SmartPOPs. The virtual SmartPOPs 1400, 1410 are essentially "transparent" to the source and destination devices that communicate with each other over the two networks via the virtual SmartPOP-to-virtual SmartPOP connection. For example, a communications path from a source SmartPOP can be made to a second network of SmartPOPs via the virtual SmartPOP 1410, in which the virtual SmartPOP 1410 broadcasts the data to all SmartPOPs in the second network. At the source device, it only knows the address of the network of SmartPOPs to which it desires to broadcast data, and this address is relayed to the source SmartPOP of the source device, which in turn sends the desired data to the virtual SmartPOP 1410 of the second network. The virtual SmartPOP 1410 then sends the data to all SmartPOPs in the second network, so in effect, the data is being sent from the source SmartPOP to all of the SmartPOPs of the second network, with the virtual SmartPOP 1410 acting as a conduit.

In the SmartPOP/FaxJack system described with reference to FIG. 3, each of the SmartPOPs exist on the periphery of the network. That is, each of the SmartPOPs are connected on one side to fax devices (via their respective FaxJacks) on analog lines (i.e., conventional telephone lines), and the SmartPOPs are connected on another side to other SmartPOPs via a digital network (such as digital network 51 as shown in FIG. 3). However, in an alternative embodiment, as shown in FIG. 16, the network topology is arranged so that SmartPOPs can send data to other SmartPOPs, called virtual SmartPOPs, which can send the data to other locations and/or networks. These virtual SmartPOPs are connected on both sides to standard SmartPOPs. The virtual SmartPOPs essentially operate as store-and-forward devices, in which they receive data on one network from one SmartPOP, and then relay the received data on another network to another SmartPOP. The virtual SmartPOPs do not exist on the periphery of the network, but instead exist in the middle of the network, and provide desired connectivity to other networks.

For example, if a source fax device desires to send a fax transmission to a destination fax device that cannot be directly accessed from any of the SmartPOPs on the same digital network as the corresponding source SmartPOP of the source fax device, then it may be possible to access a virtual SmartPOP, which can then relay the fax transmission to a second digital network, on which the destination SmartPOP corresponding to the destination fax device is located. The virtual SmartPOP thus acts as a "gateway" to other networks. In this manner, there may exist a plurality of virtual SmartPOPs to connect to a variety of networks, such as using a virtual SmartPOP to access the Internet. The virtual SmartPOPs act as real-time digital interfaces, and appear as destination SmartPOPs, but in fact are relay devices to send the data to the real destination SmartPOP. The two virtual SmartPOPs 1400, 1410 thereby provide connectivity between the two separate networks 1420, 1430.

Figure 17:
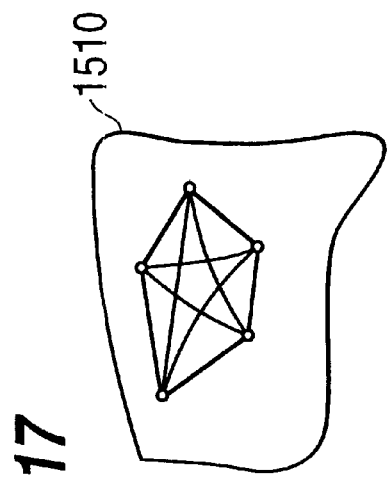
FIG. 17 shows a digital network that does not use virtual SmartPOPs that can be used with the system according to the invention.

FIG. 17 shows a typical routing tree, with each SmartPOP in a network 1510 being capable of communicating with each of the other SmartPOPs in the same network, via dedicated digital links. The network 1510 of FIG. 17 does not utilize virtual SmartPOPs. As such, each of the SmartPOPs in FIG. 17 are connected on the periphery of the network 1510.

In the above-described digital packetized fax transmission and reception scheme, packets may be received out-of-order without affecting the capabilities of the system. The receiving SmartPOP receives the out-of-order packets, and resort them so as to convert the packetized data into the proper rasterized data to be subsequently sent to the destination fax device over a conventional analog line.

Further, the multiple-cell-per-SmartPOP setup allows for automatic load balancing. When a request for a fax hookup is received at an LP allocator of one cell of the destination SmartPOP, the LP allocator first determines if its respective cell has any LPs that can handle the request. If there are no LPs available, or if there are other cells that are under-utilized, the LP allocator of the cell that received the call refers to the databases in the Resource Manager and determines which of the cells is least utilized. A line processor in that least-utilized SmartPOP is then preferably assigned to handle the fax transmission to a destination fax device, and the LP Allocator of that cell handles the call setup.

While embodiments of the invention have been described in detail hereinabove, alternate embodiments may become apparent to those of ordinary skill in the art, without departing from the scope of the invention as described herein.

What is claimed is:

1. A system for use in a digital network for providing control of data transmissions from a transmitting data device to a receiving data device over the digital network, comprising:

a plurality of point of presences (POPs) connected on the digital network and each located in a corresponding predetermined area and each configured to receive requests for data transmissions from devices within the corresponding predetermined area over a local exchange carrier operating in the corresponding predetermined area;

each of said POPs including means for transferring data in packetized format over the digital network to other of said POPs, wherein at least one of the POPs is configured to provide a path to a second network separate and distinct from the digital network, and wherein the at least one of the POPs provides a transparent interface for data transfer from the transmitting data device to the receiving data device over the digital network and the second network.

2. The system according to claim 1, wherein the second network includes a second plurality of POPs connected thereon, wherein the at least one of the POPs provides connection of the POPs connected on the digital network to the second plurality of POPs connected on the second network.

3. The system according to claim 1, wherein the first and second networks are frame relay networks.

4. The system according to claim 1, wherein the first and second networks are asynchronous transfer mode networks.

* * * * *